US006729113B2

(12) United States Patent
Miyamoto et al.

(10) Patent No.: US 6,729,113 B2
(45) Date of Patent: May 4, 2004

(54) LATERAL SEALING MECHANISM FOR BAG MAKING AND PACKAGING MACHINE, AND BAG MAKING AND PACKAGING MACHINE

(75) Inventors: Hideshi Miyamoto, Shiga (JP); Kazuya Sugimura, Shiga (JP); Makoto Ichikawa, Shiga (JP); Masashi Kondo, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 10/132,877

(22) Filed: Apr. 25, 2002

(65) Prior Publication Data

US 2002/0162305 A1 Nov. 7, 2002

(30) Foreign Application Priority Data

Apr. 27, 2001 (JP) ....................................... 2001-131070
Dec. 17, 2001 (JP) ....................................... 2001-382895

(51) Int. Cl.[7] ................................................. B65B 9/06
(52) U.S. Cl. ........................ 53/551; 53/376.2; 53/374.5
(58) Field of Search .......................... 53/550, 551, 450, 53/451, 374.5, 374.6, 375.4, 376.2

(56) References Cited

U.S. PATENT DOCUMENTS 3,629,987 A 12/1971 Klopfenstein et al.
3,850,780 A 11/1974 Crawford et al.
4,663,917 A 5/1987 Taylor et al.
4,750,313 A * 6/1988 Kammler et al.
4,947,618 A * 8/1990 Schneider et al.
5,031,386 A * 7/1991 Schneider
5,063,727 A 11/1991 Patelli
5,295,942 A * 3/1994 Franklin ..................... 493/302
5,347,795 A 9/1994 Fukuda
5,622,033 A 4/1997 Fukuda
5,685,131 A * 11/1997 Spatolisano et al. .......... 53/550
5,778,641 A * 7/1998 Simionato .................... 53/551
5,881,539 A * 3/1999 Fukuda et al.
6,367,230 B1 4/2002 Fukuda
6,421,987 B1 7/2002 Fukuda
6,519,922 B1 * 2/2003 Matheyka et al. ............ 53/552

FOREIGN PATENT DOCUMENTS

EP 0291092 * 11/1988
EP 1018470 7/2000

* cited by examiner

*Primary Examiner*—Eugene Kim
(74) *Attorney, Agent, or Firm*—Hogan & Hartson, LLP

(57) ABSTRACT

A lateral sealing mechanism for use in a bag-making and packaging machine includes movable rotary shafts. The movable rotary shafts are driven by a lateral drive mechanism so that the distance between the shafts is controllable. Support mechanisms are mounted on and rotatable about the shafts. The support mechanisms support sealing elements for forming lateral heat seals on a tubular packaging material from which the bags are formed. The support mechanisms are such that the sealing elements are tiltable with respect to the tubular packaging material, and so that two sealing elements can be maintained in directly opposed engagement to one another across the packaging material as the seal is formed. The machine includes a squeezing mechanism that operates to force the packaged material downward within the tubular material and out of a sealing region before the seal is formed. The machine also includes a shutter mechanism to force the packaged material upward and to prevent the packaged material from entering the sealing region as the seal is formed.

20 Claims, 25 Drawing Sheets

63
51
54
61
52

2

15
13
14
8
7
6
1
5
12
19
9

2

32
6
31
29
13
40
F
5
41
15
43
14
42
F
12
17
B
19

50
62
65
63
52a
53
52
64
70
64
51
62
70
51
54
61
63
65

51
53
64
70
61
65
60
52
62
53
54
63
12
71

80
75
81
83
87
82
84
85
55
88
86
52
60
60a
60a
60
60a
52
60a
76
76

154b
166
154a
153
F
154
152
151a
155
150
51
156
151
70
64
61
54

166
64
155
156
154b
153
F
51
151a
151
70
61
54
154

154b
156
153
152
70
51
166
64
155
61
54
154
151a
151

170
70
167a
167
163
164a
164
165
166
155
64
61
54
162

243
247
235
240
205
233
237
245
250
220
202

LATERAL SEALING MECHANISM FOR BAG MAKING AND PACKAGING MACHINE, AND BAG MAKING AND PACKAGING MACHINE

BACKGROUND OF THE INVENTION

The invention relates generally to packaging and sealing apparatus for packaging products inside plastic bags. More particularly, the invention provides a bag making and packaging machine that includes sealing mechanisms for sealing a tubular packaging material in longitudinal and lateral directions to make bags with a packaged material packaged inside the bags.

Vertical-type bag making and packaging machines are known for packaging materials such as food products inside plastic bags. For example, one type of packaging machine makes bags by shaping a sheet-like film packaging material into a tubular shape with a former and a tube, and then heat sealing overlapped longitudinal edges of the tubular packaging material with a longitudinal sealing mechanism. The packaged material is then filled into the tubular packaging material. Bags will ultimately he formed from this tube. A portion across the upper end area of one bag and the lower end area of another following bag is sealed by a lateral sealing mechanism, and the laterally sealed portion is then cut across its center by a cutter.

Mechanisms that press a pair of mutually opposed seal jaws against a tubular packaging material are frequently employed to heat and pressure seal the material. In systems in which the seal jaws merely reciprocate, i.e., ones in which the sealing of the packaging material is performed at only one location (a line), transportation of the packaging material must stop for the time required to form the seal. Such machines are sometimes designed, therefore, so that each of the seal jaws draws a D-shaped locus. In that case, the sealing time can be made long enough by moving the seal jaws to follow the tubular packaging material while it is transported continuously through the machine.

To make the seal jaw draw a D-shaped locus, a mechanism can be used with a grooved cam for restraining the inside and outside of a cam follower. In such a device, however, the drive member slides in sliding contact with the cam follower and the seal jaw, and this gives rise to problems of wear and durability at the points of sliding contact, especially in high speed operation.

Other mechanism have thus been devised, in which sealing mechanisms of special construction draw non-circular loci including D-shaped loci, but in which such sliding contact is largely avoided. In such constructions, though, the size of the bags that can be sealed is often restricted. Increasing the size of the bags that can be handled requires an excessive and troublesome increase in the size of the parts of the corresponding mechanism. As a result, a large space is occupied by the sealing mechanism and the machine itself may thus be excessively large.

Such mechanisms also require a large number of parts with a complicated construction, and they too sometimes suffer problems of limited durability. An additional problem often exists, moreover, where the sealing faces are restrained by cams or other elements that define their loci of motion. In particular, the sealing elements are restrained and thus cannot move away if a piece of the packaged material is caught between the sealing faces. As a result, the packaged material may be crushed or the sealing elements themselves may be damaged, especially when hard materials are being packaged with the machine.

A need exists, therefore, for improved bag-making and packaging machines of simple and reliable construction. To the extent possible, such machines should provide high speed bag making and packaging, including the formation of reliable seals in the packaging material. Such machines should be durable (so that excessive sliding contact between the machine's parts should be avoided). The machine should resist damage either of the packaged material or to the parts of the machine itself, and the machine should not be overly large or of overly complex construction.

SUMMARY OF THE INVENTION

The invention is embodied in a lateral sealing mechanism and in bag making and material packaging machines that use such lateral sealing mechanisms. A lateral sealing mechanism according to the invention may include at least one sealing element that is operable to contact and seal a tubular packaging material. The seal may be formed, e.g., by applying heat from the sealing element to the tubular packaging material to form a heat seal.

The sealing element is supported on a support mechanism. The support mechanism includes a cam follower that engages with a cam face on a cam. The support mechanism is movable to contact the sealing element with the packaging material, and then to separate the two after the seal is formed. The support mechanism is supported on a rotary shaft so that the support mechanism rotates around the shaft. The lateral direction drive mechanism moves the cam and the rotary shaft together in a direction perpendicular to the rotary shaft as the support mechanism rotates about the shaft.

DESCRIPTION OF THE PREFERRED EMBODIMENTS

Figure 1:
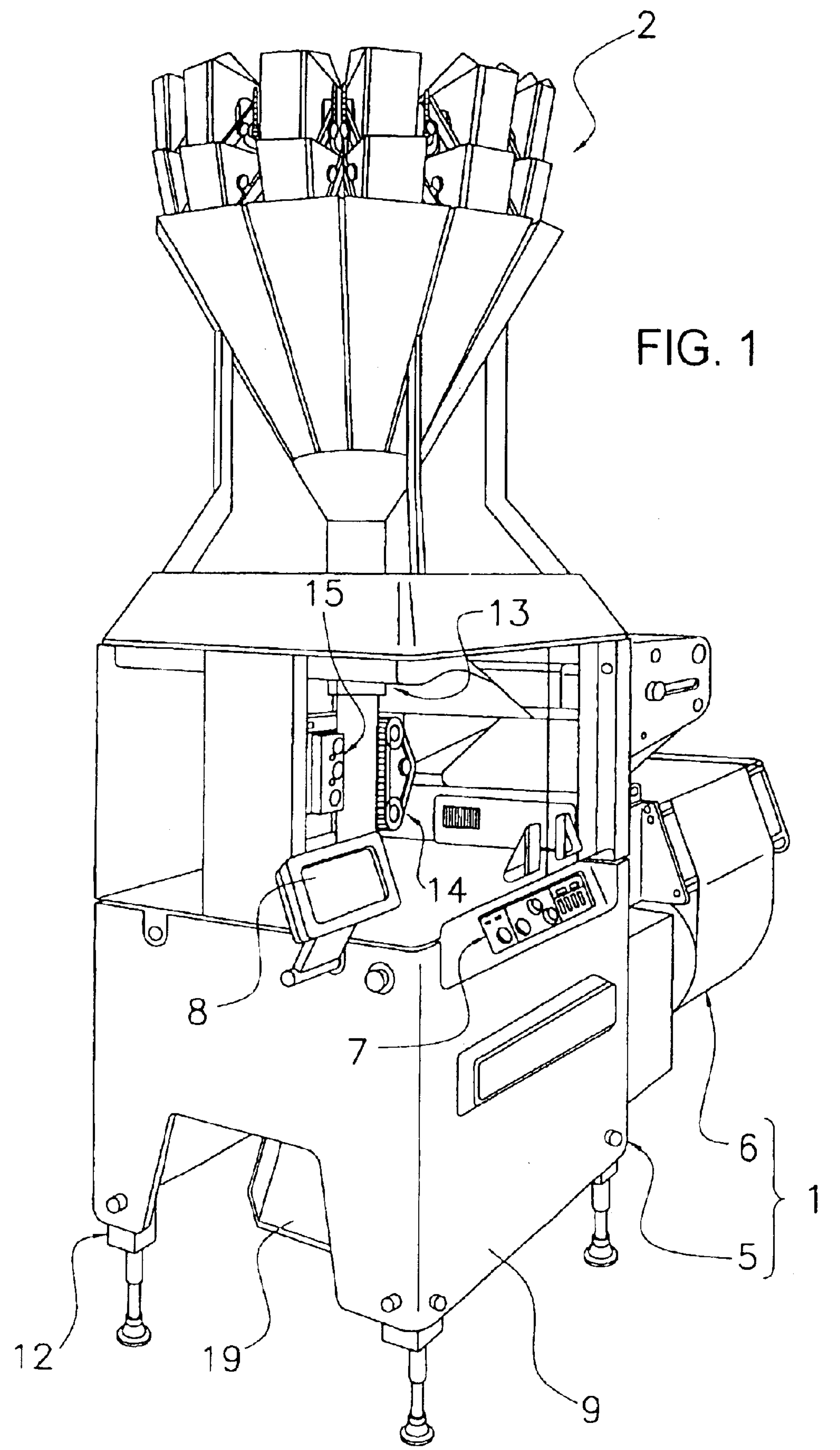
FIG. 1 is a perspective view of a bag making and packaging machine according to one embodiment of the invention.
Figure 2:
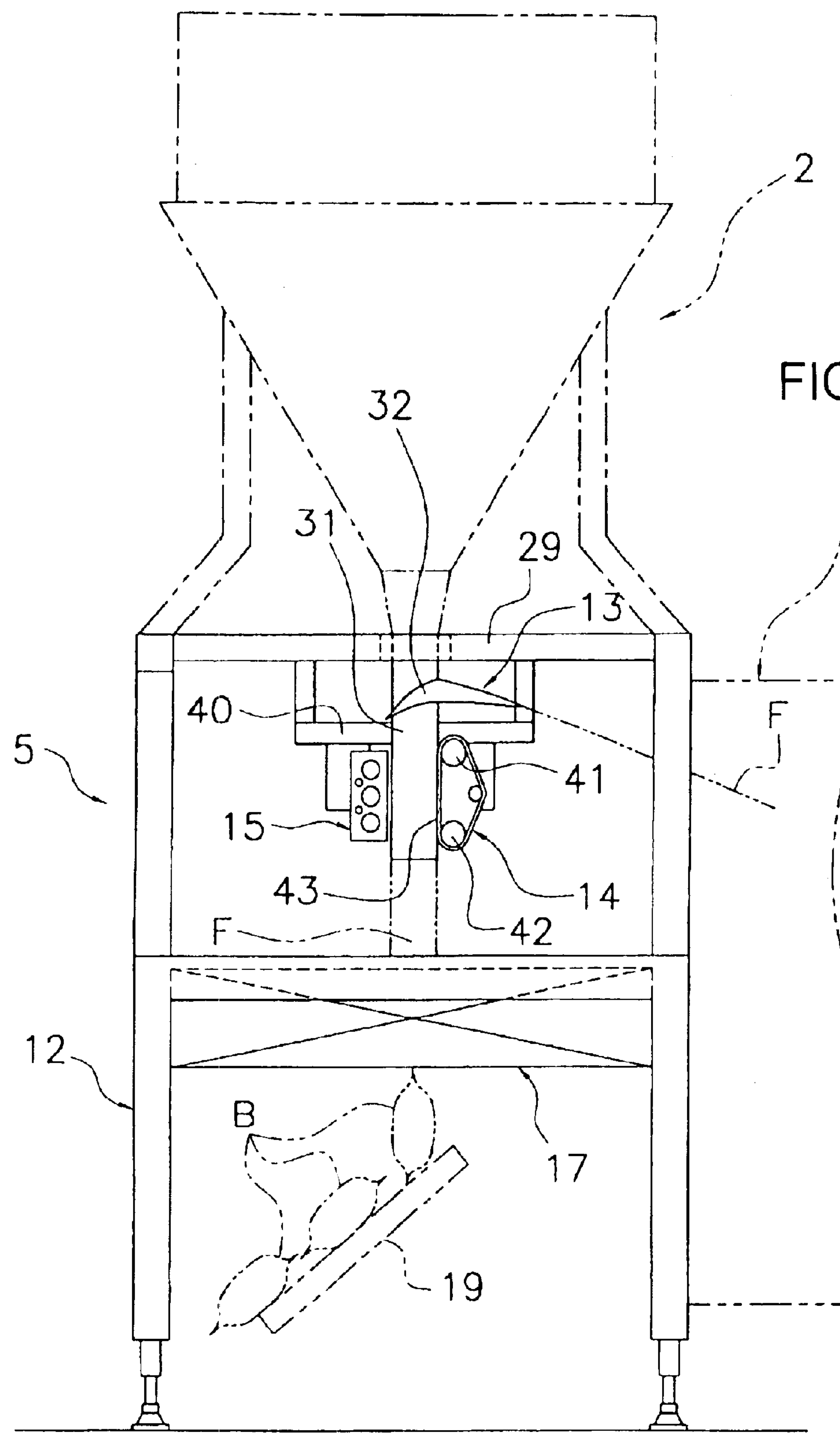
FIG. 2 is a side view of a bag making and packaging unit.

A bag making and packaging machine according to one embodiment of the invention is shown in FIG. 1 and FIG. 2. The bag making and packaging machine 1 shown in these drawings is a machine for packaging a material such as potato chips. The machine comprises mainly a bag making and packaging unit 5 that includes a main body portion for packaging the material to be packaged, and a film supply unit (packaging material supply unit) 6 for supplying a film that will be made into bags to the bag making and packaging unit 5. The bag making and packaging unit 5 has a front face on which operation switches 7 are disposed. A liquid crystal display 8 for displaying operation conditions for the machine is arranged in a position where an operator who operates the switches 7 can see and use it.

The film supply unit 6 is a unit for supplying a sheet-like film to a shaping mechanism 13 of the bag making and packaging unit 5. The film supply unit may disposed adjacent to the bag making and packaging unit 5. A roll of film is held by the film supply unit 6 so that film can be drawn out of the roll. Since the work of replacing the roll requires a certain space, the film supply unit 6 is not necessarily located adjacent to the bag making and packaging unit 5, but may instead be disposed in a place apart from it.

As shown in FIG. 1 and FIG. 2, the bag making and packaging unit 5 comprises a shaping mechanism 13 for shaping the film, which is fed as a sheet, into a tubular shape, a pull-down belt mechanism (packaging material transport mechanism) 14 for transporting the tubularly shaped film (which is hereinafter referred to as "tubular film") downward, a longitudinal sealing mechanism 15 for sealing (heat sealing) an overlapped portion of the tubular film in a longitudinal direction, a lateral sealing mechanism 17 for closing the upper and lower ends of a bag by sealing the tubular film in a lateral direction, and a support frame 12 for supporting the above mechanisms. An enclosure 9 is attached around the support frame 12.

As shown in FIG. 2, the shaping mechanism 13 has a tube 31 and a former 32. The tube 31 is a cylindrical member open at both its upper and lower ends. The tube 31 is disposed at an opening at the center of a top plate 29 in a horizontal plane and integrated with the former 32 via a bracket (not shown). A weighed material to be packaged is fed to the opening at the upper end of the tube 31 from a computer scale 2, or another product weighing or dispensing device, e.g., a multihead weigher, a combination weigher, or a combinational weighing machine. The former 32 surrounds the tube 31. The former 32 has a shape such that the film sheet F from the film supply unit 6 is shaped into a tubular shape while passing between the former 32 and the tube 31. The former 32 is also fixed on the support frame 12 via a support member (not shown). Different tubes 31 and formers 32 of the shaping mechanism 13 are interchangeable according to the size of the bag to be produced. The shaping mechanism 13 is therefore detachably mounted to the support frame 12.

The pull-down belt mechanism 14 and the longitudinal sealing mechanism 15 are supported by a rail 40 suspended from the top plate 29 and disposed on both sides of the tube 31. These mechanisms 14 and 15 are movable along the rail 40 so that their positions can be adjusted when the tube 31 is exchanged. The pull-down belt mechanism 14 pulls the tubular film F downward, and comprises mainly a driving roller 41, a driven roller 42, and a belt 43 for driving the film. The longitudinal sealing mechanism 15 is a mechanism for sealing an overlapped portion of the tubular film wound about the tube 31 in a longitudinal direction by applying heat to the overlapped portion while pressing the film against the tube 31 with a certain pressing force. The longitudinal sealing mechanism 15 includes a heater, a heater belt, which is heated by the heater and which contacts the overlapped portion of the tubular film, and so on.

Description will be next made of the lateral sealing mechanism 17. The lateral sealing mechanism 17 is disposed below the shaping mechanism 13, the pull-down belt mechanism 14, and the longitudinal sealing mechanism 15, and is supported by the support frame 12.

In addition to the sealing mechanism, a shutter mechanism and a squeezing mechanism are provided to prevent an excess of the packaged material from dropping into the sealed region of the bag and for squeezing packaged material in the sealed region downward and away from the sealed region. Descriptions of the shutter and the squeezing mechanisms appear in more detail below. Possible configurations for the shutter and squeezing mechanisms are not limited, though, to the configurations of the exemplary embodiments described below.

Figure 3:
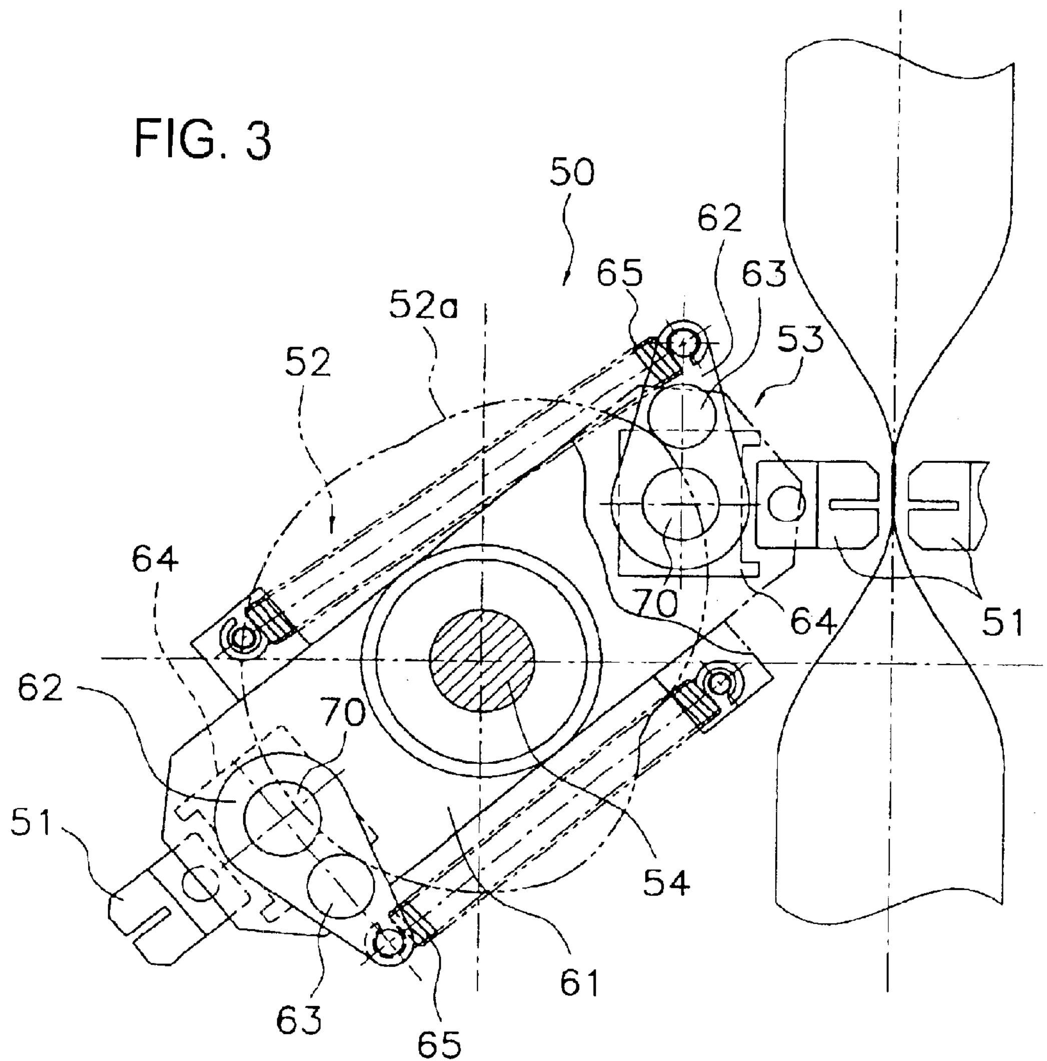
FIG. 3 is an enlarged view of a part of a lateral sealing mechanism.
Figure 4:
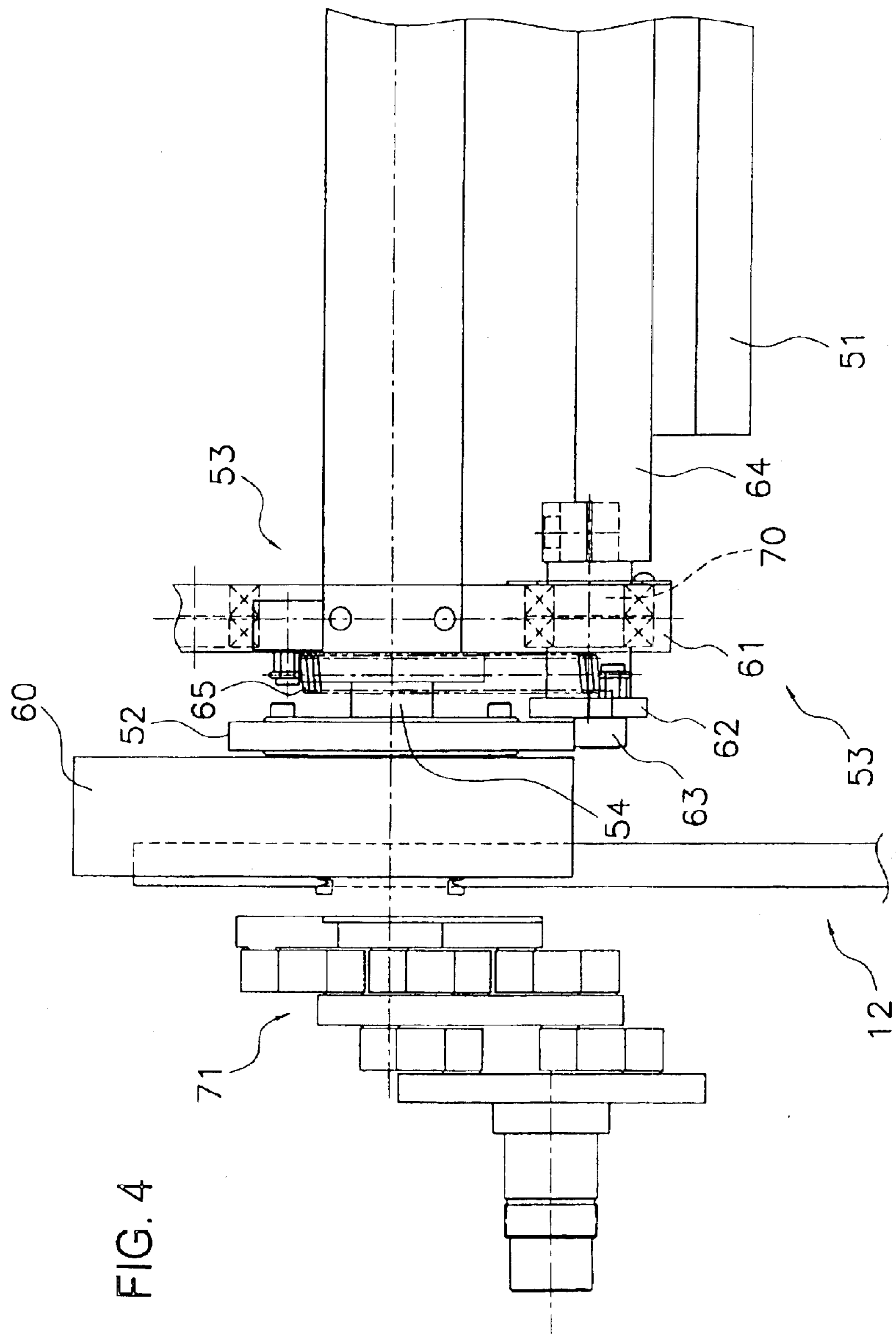
FIG. 4 is a plan view of a part of the lateral sealing mechanism.

The lateral sealing mechanism 17 includes a pair of symmetrical mechanisms 50, one of which is shown in FIG. 3. FIG. 4 shows a part of the lateral sealing mechanism 17 viewed from above. Although a single one of the mechanisms 50 will be described below, the mechanism provided on the other side has nearly the same structure except for the presence or absence of a cutter mechanism and the shape of its cams.

Figure 5:
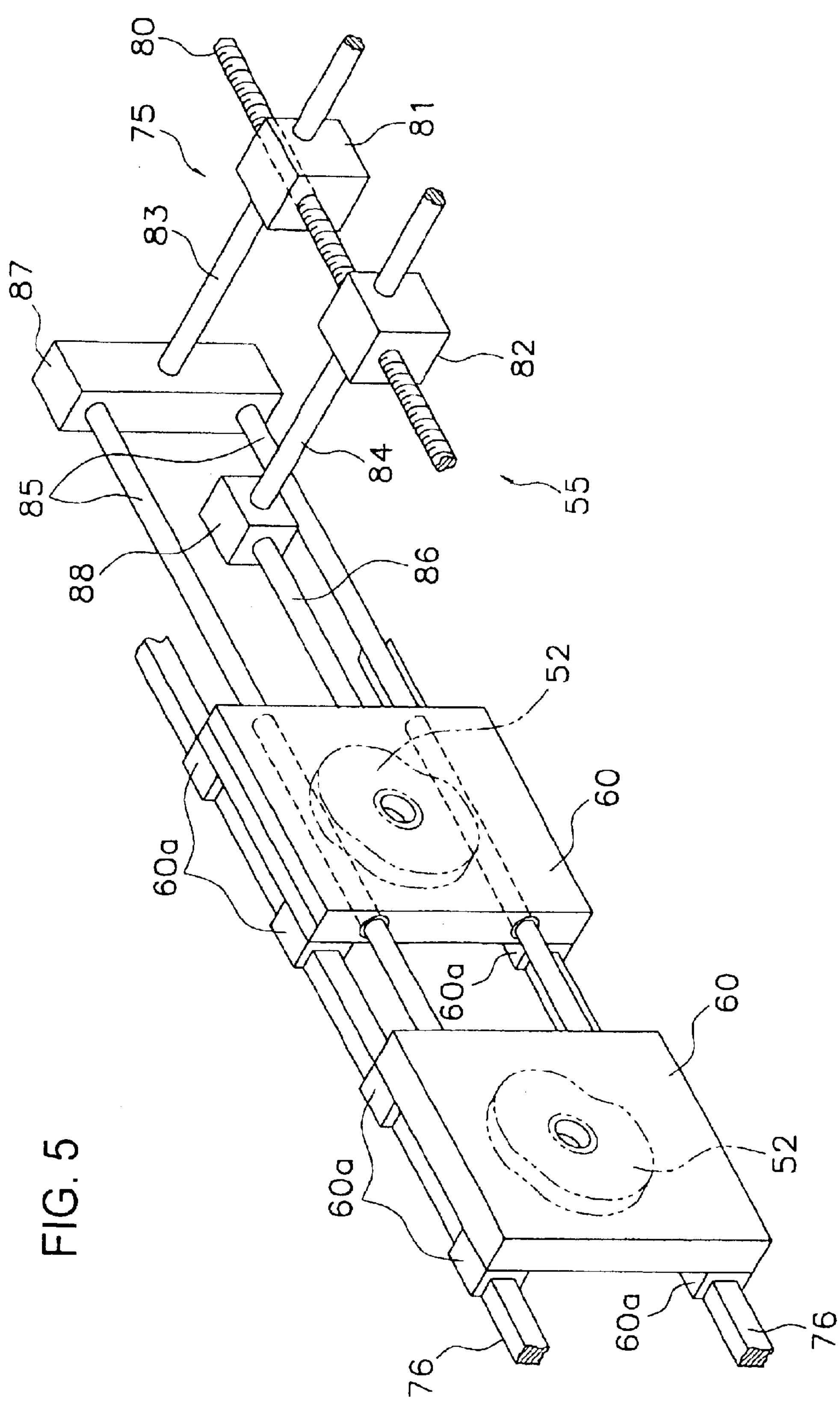
FIG. 5 is a perspective view of a lateral direction drive mechanism.

The mechanism 50 rotates two seal jaws 51 through a generally D-shaped path. The mechanism presses one of the seal jaws 51 against an opposed seal jaw 51 of the other mechanism to, seal the tubular film in a lateral direction. The mechanism 50 comprises mainly a cam 52, a support mechanism 53 for supporting the seal jaw 51, a rotary shaft 54, and a lateral direction drive mechanism 55, which is shown in FIG. 5. The seal jaw 51 is a member that extends across the width of the tubular film in a direction perpendicular to the views of FIG. 2 and FIG. 3, and which has a heater inside it. A sealing face of the seal jaw 51 is heated by the heater to heat-seal a portion of the tubular film material that is pinched between the right and left seal jaws 51. Two sets of cams 52 and support mechanisms 53, and a lateral direction drive mechanism 55, are provided at longitudinally opposite ends of the seal jaws 51. Each such set has generally the same structure as that described below.

Each cam 52 is fixed inside a moving plate 60 of the lateral direction drive mechanism 55. The cam 52 has a cam face 52*a* formed on its periphery, as shown by double-dashed lines in FIG. 3. The support mechanism 53 has a connecting member 61 fixed at a central portion on a rotary shaft 54, and a pair of hinging members 62, a pair of cam followers 63, a pair of base members 64, and a pair of coil springs 65 at the opposite ends of the connecting member 61.

As shown in FIG. 4, the connecting member 61 is a block-like member that is long in one direction and that rotates together with the rotary shaft 54. The connecting member 61 is disposed inside the cam 52 and outside the seal jaws 51. The hinging members 62 are disposed outside the connecting member 61 with a certain space between them, with each rotatably supported at one end on the connecting member 61 by a hinging shaft 70. The rotary hinging shafts 70 extend through the connecting member 61 to the inside thereof, with each being fixed on the base member 64. The seal jaw 51 is supported by the base member 64. The base member 64 and the seal jaw 51 are thus rotated synchronously with the hinging member 62. The cam follower 63 is rotatably mounted on an outer surface of the hinging member 62. The cam follower contacts the cam face 52*a* of the cam 52. A single cam follower 63 is provided for each hinging member 62. The coil spring 65 urges the hinging member 62 in one direction to press the cam follower 63 against the cam face 52*a*. The coil spring 65, one end of which is engaged with an end of the hinging member 62 on the opposite side of the rotatably supported side, and the other end of which is engaged with the connecting member 61 at a place on the opposite side with respect to the rotary shaft 64, is provided between the hinging member 62 and the connecting member 61.

Figure 9A:
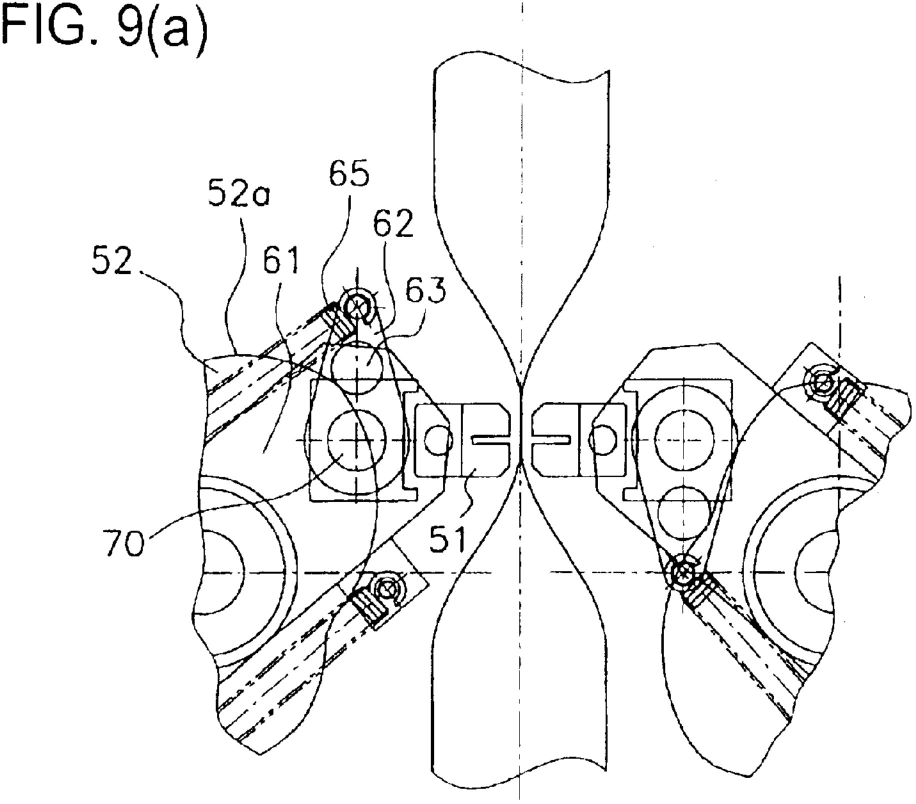
FIGS. 9(*a*) and 9(*b*) are a view illustrating an operation of the machine in a case in which an object is caught in the mechanism.
Figure 9B:
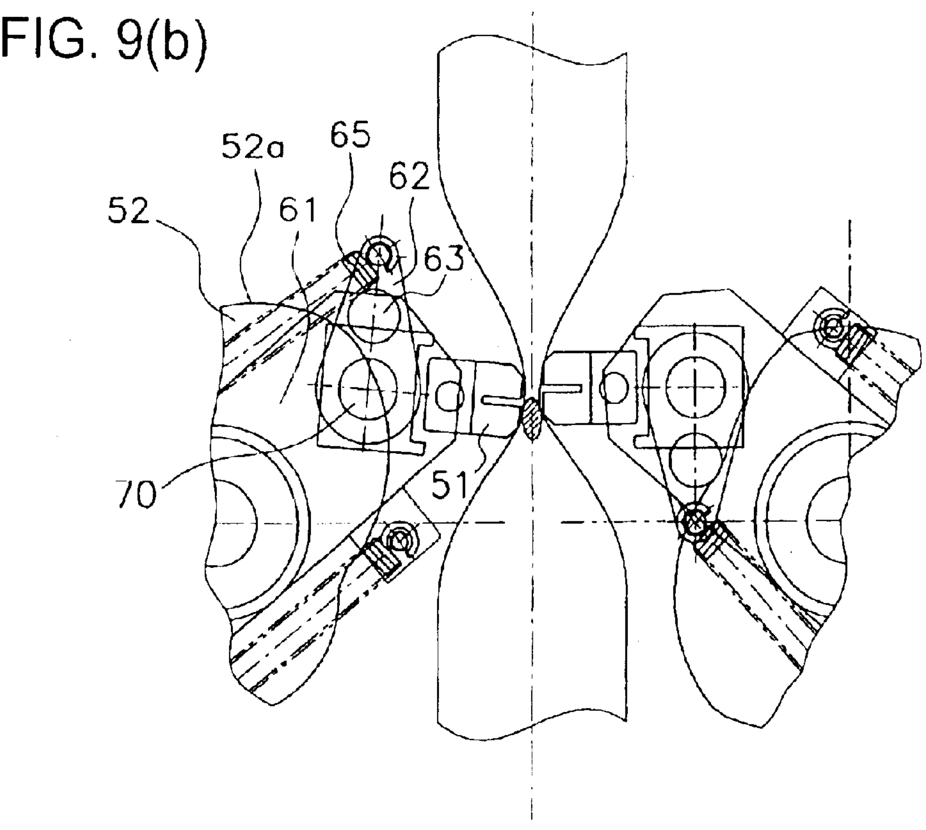

In the support mechanism 53, the hinging member 62 rotates with respect to the connecting member 61 so that the seal jaw 51 can tilt in one direction with respect to the packaging material. As illustrated in FIGS. 9(*a*) and 9(*b*), the hinging members 62 of the right and left mechanisms are constructed to rotate or hinge in different directions with respect to one another. More specifically, when the right and the left seal jaws 51 are opposed to each other, the cam follower 63 of the hinging member 62 on the left side abuts the cam face 52*a* above the seal jaw 51, whereas the cam follower 63 of the hinging member 62 on the right side abuts the cam face 52*a* below the seal jaw 51. Thus, as illustrated in FIG. 9(*b*), the seal jaw 51 on the left side can hinge (tilt) only downward and the seal jaw 51 on the right side can hinge (tilt) only upward.

The rotary shaft 54 is provided in parallel with the seal jaws 51 and connected to the connecting members 61 on both sides of the shaft. The rotary shaft 54 and the connecting member 61 are fixed and thus incapable of rotating relative to one another. As shown in FIG. 4, one end of the rotary shaft 54 extends through the cam 52 and the moving plate 60 to protrude outside the support frame 12. This end is connected to a rotation drive mechanism (not shown), such as a motor, via a Schmidt coupling 71.

The other end of the rotary shaft 54 extends through the cam and the moving plate on the other side to protrude outside the support frame. This end is provided with a slip ring (not shown) for supplying electric power to the heater and other such apparatus. The rotary shaft 54 is rotatably connected to the cams 52 and the moving plates 60, but non-movable relative to them in a lateral direction (a direction across the rotary shaft). The rotary shaft 54 thus moves together with the cams 52 and the moving plates 60 in the lateral direction.

The Schmidt coupling 71 includes three disks connected by a link, and is a shaft coupling for transmitting the rotation of an input shaft to the rotary shaft 54, which thus serves as an output shaft. The Schmidt coupling 71 can transmit the rotation of the input shaft to the rotary shaft 54 even when the rotary shaft 54 is moves with respect to the input shaft and the distance between the axes of both shafts is changed.

As shown in FIG. 5, the lateral direction drive mechanism 55 has a pair of moving plates 60 on which the cams 52 of the right and left sealing mechanisms are mounted, and a drive mechanism 75 for moving the paired moving plates 60 closer to or farther away from each other. This mechanism is also provided on the other side in the same manner.

Each of the paired moving plates 60 is a rectangular member that rotatably supports, at its center part, the rotary shaft 54. Guide parts 60*a* are provided at upper and lower ends of an outer surface of the moving plate 60. Each of the guide parts 60*a* is slidably engaged with one of guide rails 76 on the support frame.

The drive mechanism 75 includes a ball screw 80, which is rotated by a motor (not shown), first and second nut members 81 and 82 in threaded engagement with the ball screw 80, first and second connecting rods 83 and 84 crossing the ball screw 80 at right angles in a horizontal direction, a pair of third connecting rods 85 provided along mechanism's moving direction, and a fourth connecting rod 86 provided in parallel with the third connecting rods 85.

The first connecting rod 83 is connected to the paired third connecting rods 85 via a coupling 87. Both of the paired third rods 85 have ends fixed on a side surface of one of the moving plates 60, and extend sidably through the other moving plate 60. One end of the second connecting rod 84 is connected to the fourth connecting rod 86 via a coupling 88. The end of the fourth connecting rod 86 is fixed on a side surface of one of the moving plates 60.

In the ball screw 80, the portion on which the first nut member 81 is threaded and the portion on which the second nut member is threaded are threaded in the opposite direction with each other. With the drive mechanism 75, the paired moving plates can be moved closer to or farther away from each other by rotating the ball screw 80.

Figure 6A:
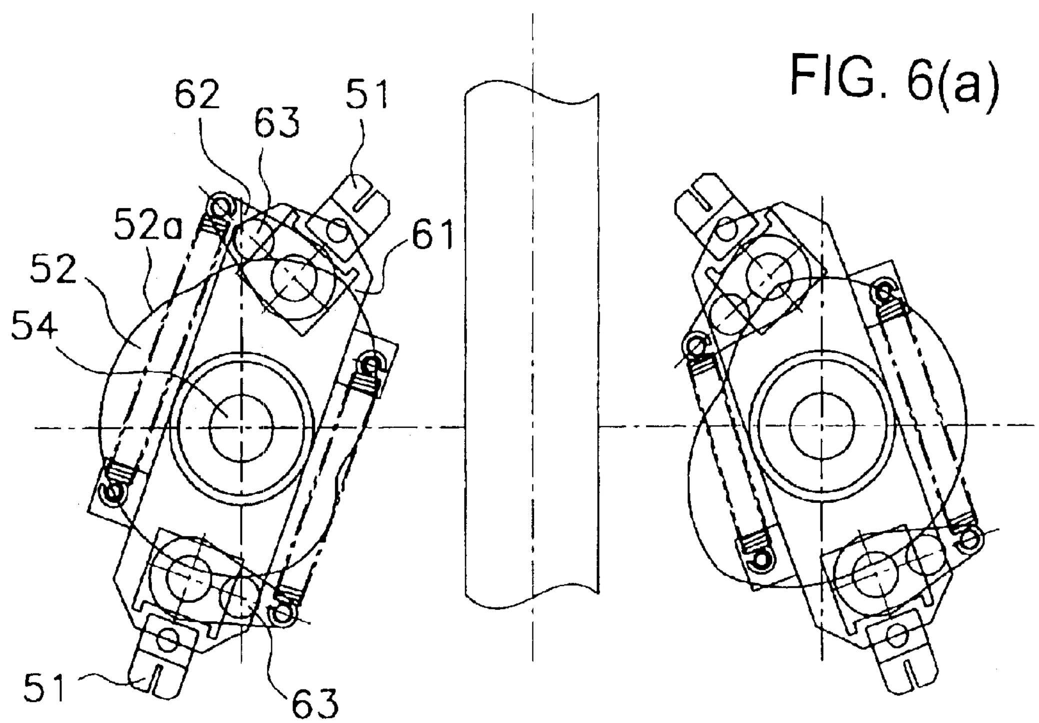
FIGS. 6(*a*) and 6(*b*) are schematic view explanatory of a lateral sealing operation.
Figure 6B:
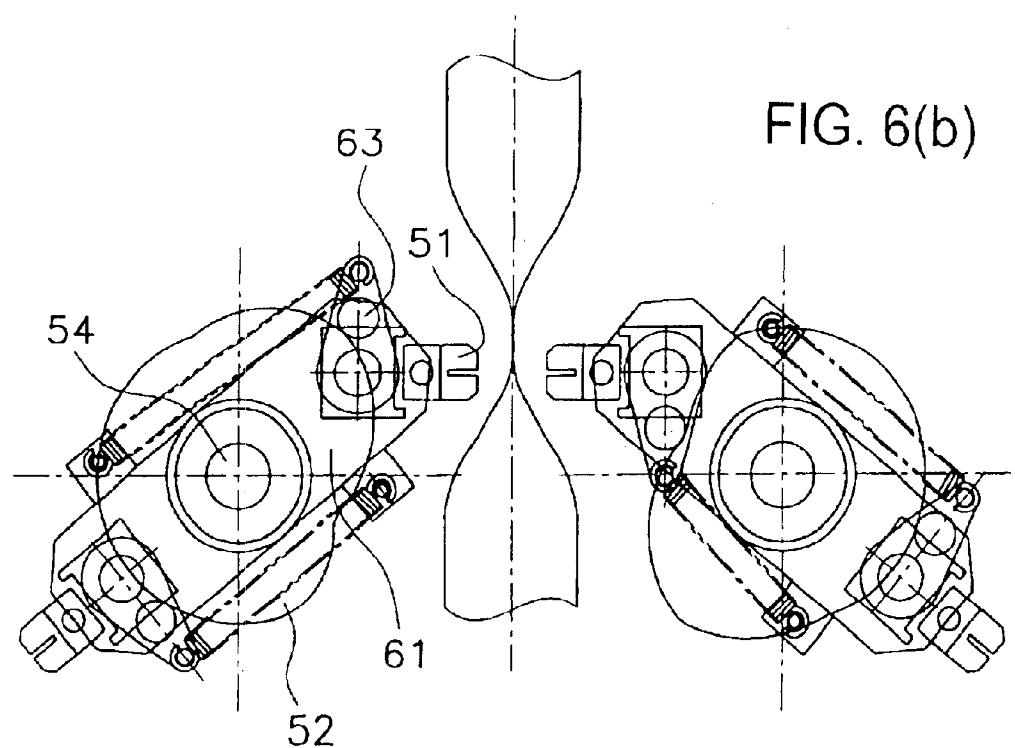
Figure 7:
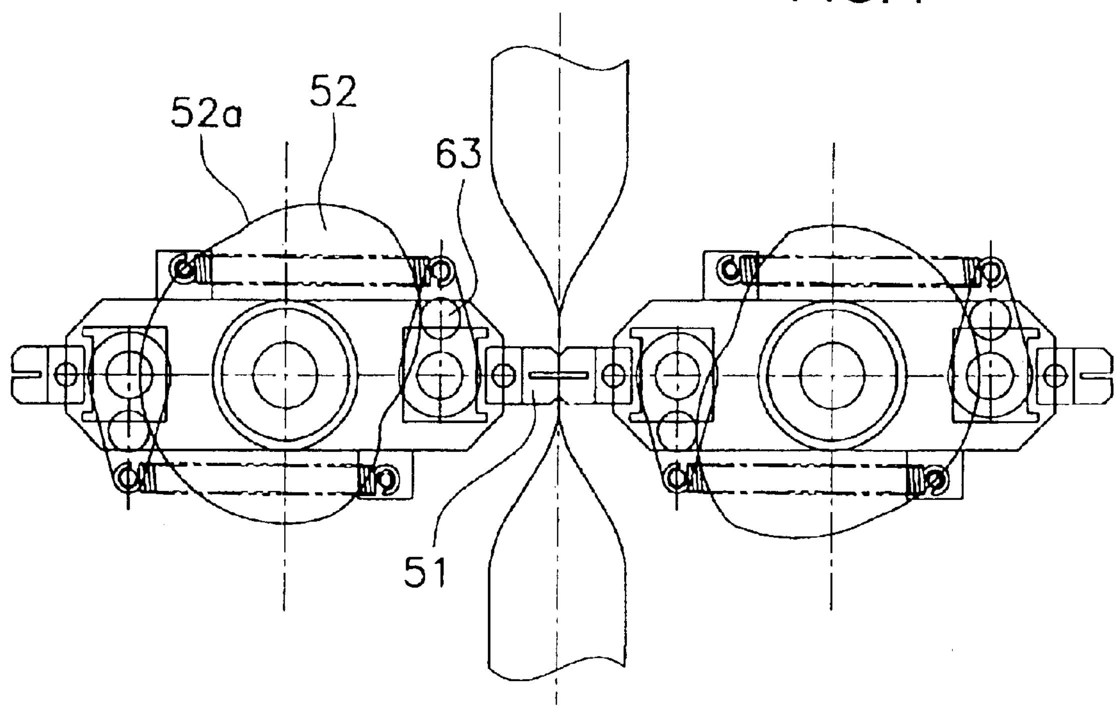
FIG. 7 is a second schematic view explanatory of the lateral sealing operation.
Figure 8A:
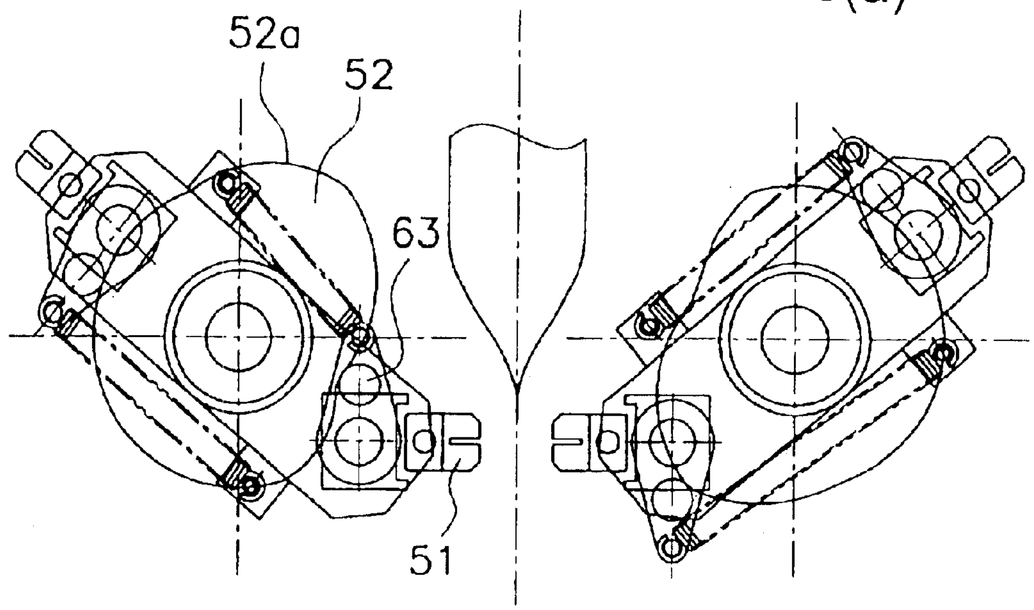
FIGS. 8(*a*) and 8(*b*) are third and fourth schematic views explanatory of the lateral sealing operation.
Figure 8B:
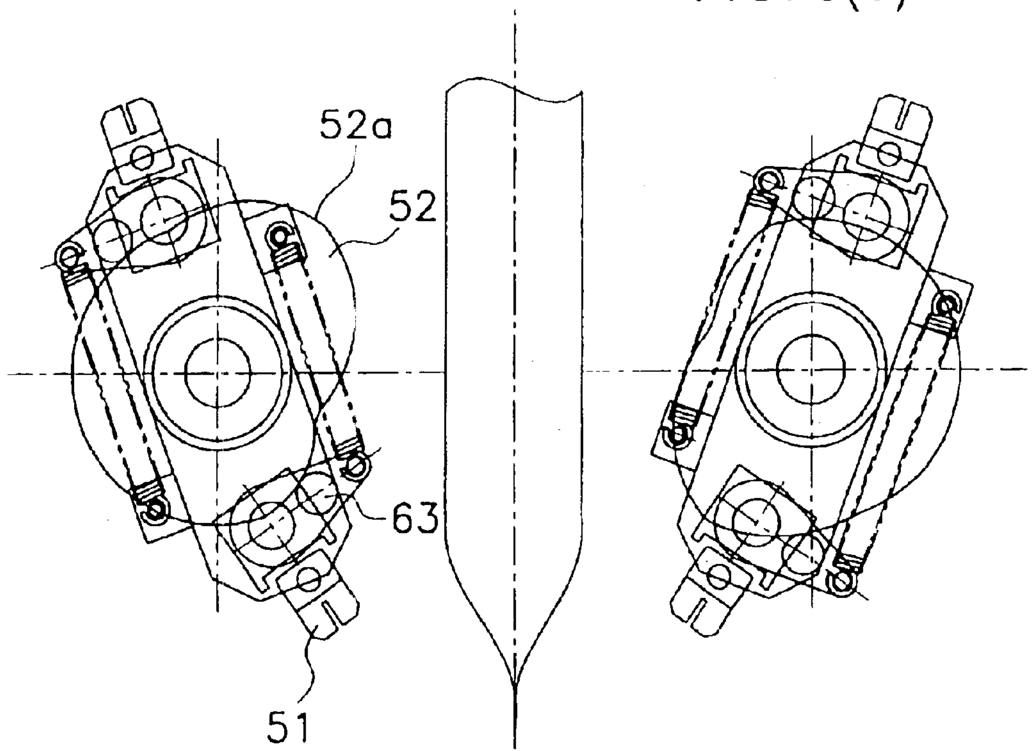

Description will next be made of the operation of the bag making and packaging machine with reference to FIG. 2 and FIGS. 6 to 8. In FIGS. 6 to 8, the members are shown overlapped with each other for a better understanding of the movements of each member.

The sheet-like film F fed from the film supply unit 6 to the shaping mechanism 13 is wound from the former 32 to the tube 31, shaped into a tubular shape, and transported downward by the pull-down belt mechanism 14. When the film F is wound about the tube 31, the edges of the film are overlapped on the peripheral surface of the tube 31, and the overlapped portion is longitudinally sealed by the longitudinal sealing mechanism 15.

The tubular film F, having been sealed longitudinally into a tubular shape, leaves the tube 31 and goes down to the lateral sealing mechanism 17. Simultaneously with the movement of the tubular film F, a quantity of the material to be packaged is dropped from the computer scale 2 down through the tube 31. Then, in the lateral sealing mechanism 17, the upper end of a first bag, which now contains the quantity of packaged material inside the tubular film F, and the lower end of a second bag above the first bag, are both simultaneously sealed laterally.

The lateral sealing operation will next be described in detail. In the lateral sealing mechanism 17, the rotary shaft 54 is rotated by a rotating motor (not shown), whereby the hinging members 62 and the seal jaws supported thereby rotate via the connecting member 61 about the rotary shaft 54. The two cam followers 63 mounted on both ends of one connecting member 61 bear on and move around the cam face 52*a* of the cam 52.

FIG. 6(*a*) shows a state before the sealing process in which the seal jaws 51 are not abutted on the tubular film. FIG. 6(*b*) shows a state just before sealing begins. The cam faces 52*a* are shaped so that the sealing faces of the right and left seal jaws 51 face upward in the stage shown in FIG. 6(*a*), and so that the right and left sealing faces are opposed to each other in the stage of sealing process shown in FIG. 6(*b*).

As these drawings illustrate, the cams 52 and the rotary shafts 54 are moved in a lateral direction between the states shown in FIG. 6(*a*) and FIG. 6(*b*). Namely, in the state shown in FIG. 6(*a*), the right and left cams 52 and the rotary shafts 54 are relatively apart from each other, but in the state shown in FIG. 6(*b*), the right and left cams 52 and the rotary shafts 54 are closer to each other as compared with the state shown in FIG. 6(*a*). Lateral movement of the cams 52 and the rotary shafts 54 is made by rotating ball screw 80 with a lateral driving motor during the transition from the state shown in FIG. 6(*a*) to the state shown in FIG. 6(*b*).

When the rotary shaft 54 rotates further from the state shown in FIG. 6(*b*), the cam follower 63 moves further along the cam face 52*a*. The sealing faces of the right and left seal jaws 51 are maintained in opposition to one another as shown in FIG. 7. The sealing faces bear against one another with the tubular film interposed between them. The tubular film is heat-sealed at this time by the sealing faces of the sealing jaws 51. During the transition from the state shown in FIG. 6(*b*) to the state shown in FIG. 7, the cams 52 and the rotary shafts 54 are moved in a direction away from one another by the lateral direction drive mechanism 55.

When the right and left seal jaws 51 move through the sealing stage shown in FIG. 7, the upper end of a preceding bag and the lower end of the following bag are sealed substantially simultaneously. Simultaneously with the sealing, the preceding bag and the following tubular film are separated by a cutter mechanism (not shown) built into one of the seal jaws 51.

As the rotary shaft 54 rotates further, the cam follower 63 moves further along the cam face 52*a*, passing through a state shown in FIG. 8(*a*) to reach the state shown in FIG. 8(*b*). The cam faces 52*a* are shaped so that the sealing faces of the right and left seal jaws 51 are still opposed to each other in a stage just after the sealing process, as shown in FIG. 8(*a*), and so that the right and left sealing faces face downward in the final stage, as shown in FIG. 8(*b*).

During the transition from the state shown in FIG. 7 to the state shown in FIG. 8(*a*), the cams 52 and the rotary shafts 54 are moved nearer to each other. During the transition from the state shown in FIG. 8(*a*) to the state shown in FIG. 8(*b*) the cams 52 and the rotary shafts 54 are away from each other.

The bags formed in the sequence described here are directed onto a belt conveyer (not shown) by a tilted guide plate 19 shown in FIG. 1 and FIG. 2, and transported to a device for the subsequent processing, e.g., a weight checker or other apparatus.

As the description above indicates, the cam faces 52*a* of the cams 52 are shaped so that the sealing faces face upward as the right and left seal jaws 51 come into opposition with one another in a stage previous to the sealing process. The sealing faces are opposed to each other during sealing, and the sealing faces face downward in a final stage after sealing.

During this movement, the cams 52 and the rotary shafts 54 reciprocate in a lateral direction perpendicular to the rotary shafts 54, driven by the lateral direction drive mechanism 55, as the seal jaws 54 are opposed to one another through the tubular film. More specifically, in a stage before the sealing process, as shown in FIG. 6(*a*), and in a stage after the sealing process, as shown in FIG. 8(*b*), the cams 52 and the rotary shafts 54 are moved away from one another to separate the entire sealing mechanism from the tubular film. The tubular film can thus be prevented from adhering to the seal jaws 51 before and after the sealing process, and more rapid bag-making can thereby be accomplished. Since the cams 52 and the rotary shafts 54 are moved, moreover, a sufficient space can be maintained between the right and left mechanisms even though the mechanisms such as cams are made small so that larger bags can be handled. This configuration provides a small-sized, general-purpose apparatus capable of high-speed operation.

In addition to the above, and as FIGS. 6(*a*) and 8(*b*) illustrate, the cam faces 52*a* are shaped so that the sealing faces of the seal jaws 51 face upward and downward, respectively, in the stages before and after the sealing process, in which the seal jaws 51 are opposed to one another through the tubular film. The seal jaws thus move into and out of mutual opposition more quickly as compared with a case where the sealing faces are maintained in mutual opposition to one another throughout this cycle, so that still more rapid operation can be accomplished.

Moreover, since the cam 52 and the rotary shaft 54 on each side of the mechanism are moved together in the lateral direction, there is no sliding contact between them. This improves the durability of the cams in particular, as compared with conventional mechanisms.

FIGS. 9(*a*) and 9(*b*) illustrate operation of the machine in a case in which a piece of the packaged material is caught in the sealing region during the sealing process.

FIG. 9(*a*) shows a normal sealing process in progress. In this state, the cam followers 63 of the right and left sealing mechanisms move while being pressed against the cam faces 52*a* by the coil springs 65.

Suppose, though, that a piece of the packaged material is caught during sealing between the right and left seal jaws 51, as shown in FIG. 9(*b*). The piece is pressed between the lower parts of the right and the left seal jaws 51. In this case, a force exerted on the seal jaw 51 by the piece rotates the hinging member 62 on the left side downward about the hinging shaft 70, and against the force of the coil spring 65. This separates the cam follower 63 from the cam face 52*a*. On the other hand, in the hinging member 62 on the right side, the cam follower 63 is not constructed to separate from the cam face 52*a* when the seal jaw 51 receives a reaction force at a lower part thereof. More specifically, the hinging member 62 on the right side is barred from rotating in the same direction as the rotating direction of the hinging member 62 on the left side, but is instead rotatable only in the opposite direction.

When a piece of material to be packaged is caught between the upper parts of the seal jaws, the hinging member 62 on the right side is rotated upward about the right side hinging shaft 70. Such a case is the reverse of the one described above. If a piece of the packaged material is caught at a center part between the seal jaws 51, rotation occurs by a reaction force applied on either on an upper part or a reaction, or one applied on a lower part, whichever is stronger, from the piece of the packaged material.

As described above, the right and left seal jaws 51 are tiltable not in the same direction but in different directions. If both of the seal jaws 51 were constructed to tilt in the same direction when catching occurs as shown in FIG. 9(*b*), the piece of packaged material might be crushed by the seal jaws 51, or the seal jaws 51 might themselves may be damaged. The seal jaws 51 in this embodiment are constructed so that only one is tilted or they both are tilted in opposite directions when they receive a force in the same direction. Thus, even when if piece of the packaged material is caught, the piece will not be crushed and the seal jaws 51 themselves will not be damaged.

Some features of the above-described first embodiment of the bag making and packaging machine are summarized here. Because the cams 52 and the rotary shaft 54 are moved together in the lateral direction while the rotary shaft 54 is rotated to move the seal jaws 51 circularly, and because the seal jaws are made to draw a D-shaped locus, the entire lateral sealing mechanism including the cams 52 can be made small in a general-purpose mechanism for sealing a wide range of bags of various sizes.

There is no sliding contact between the cam 52 and the rotary shaft 54. This improves the durability of the cam 52 can be improved. The cams 52 and the rotary shaft 54 are moved together in the lateral direction to separate the seal jaw 51 from the tubular film, especially in the sections before and after the sealing process, during which the seal jaw 51 is opposed to the tubular film. This helps to prevent the tubular film from adhering to the seal jaw 51, thereby speeding the bag-making operation.

Because only one seal jaw 51 is provided for each cam follower 63, the contact area between the cam 52 and the cam follower 63 is smaller as compared with conventional apparatus. This improves the durability of the cam 52.

The seal jaws 51 are tiltable. When a piece of the packaged material is caught between the jaws, the piece can be prevented from being crushed or the seal Jaws 51 damaged. In particular, the right and left seal jaws 51 tilt in different directions, further insuring against damage to the material or the seal jaws 51.

Because the cam faces 52 are shaped so that the sealing faces face upward as the seal jaws 51 begin to be opposed to each other and downward in the final stage after sealing, the distance between the right and left seal jaws 51 can be increased more quickly than would otherwise be the case. This speeds the machine's operation.

In this embodiment, sealing pressure in the sealing mechanism is transmitted to the rotary shaft 54 via the hinging shaft 70 and the connecting member 61 and is not applied to the cam 52 and the cam followers 63. The cam 52 and the cam followers 63 can thus be made smaller than would otherwise be possible.

Two sets of seal jaws 51 and support mechanisms 53 are provided for each rotary shaft 54, which increases the effective operational speed of the machine. The cost of the machine can be reduced, as well, by reducing the capacity of the motor and other machine elements. This may also improve the durability of the motor in comparison with the case where only one such set of parts is provided.

The exact mechanism for driving the cam and the rotary shaft is not strictly limited that of the embodiment described above. Various alternative constructions may be used as long as the right and left mechanisms are moved with appropriate synchronization.

The number and configuration of the support mechanisms 53 for each rotary shaft 54 are not limited precisely to those of the above embodiment. Two or more such support mechanisms may be used for each rotary shaft.

Although the embodiment described above includes a pair mechanisms 50, one on each side, other embodiments may include a single mechanism 50 on one side only. In such a case, a member may be provided that moves in the same direction and at the same speed as the film for receiving sealing pressure from the seal jaw 51 on the side of the film opposite the seal jaw. Such mechanisms may include, e.g., a rotating belt mechanism similar to that used in the pull-down belt mechanism 14.

The embodiment described above can include various structures that serve as squeezing and shutter mechanisms, and therefore, definitions and descriptions of those mechanisms were omitted from the above description. A squeezing mechanism 150 and a shutter mechanism 160 are described in detail below. These squeezing and shutter mechanisms can be applied to the bag making and packaging machine 1 described above. Doing so decreases significantly the chances of catching the packaged material during the sealing process, and sealing failures can reduced during the high-speed bag making and packaging process.

As will be described below, the rotational velocity of the rotary shaft 54 can be controlled to appropriately change the turning velocities of a squeeze abutting member 155 of the squeezing mechanism 150, a shutter abutting member 166 of the shutter mechanism 160, and the seal jaw of the lateral sealing mechanism 17. This can make the sealing and the squeezing operations more effective, resulting in decreased failure incidence and faster operation in the bag making and packaging process. FIGS. 10 and 13–17 depict various members overlapped and illustrated with solid lines to illustrate the movements of those members.

The squeezing mechanism 150 includes a pair of (right and left) mechanisms, one on such mechanism on each side of the film F. Each of these mechanisms is supported by one of the base members 64 of the lateral sealing mechanism 17, with these base members being rotated in opposite directions. (See FIG. 10.) Each of the squeezing mechanisms 150 comprises a squeeze fixing member 151, a stopper 152, a parallel link members 153, a squeeze moving member 154, a squeeze abutting member 155, and a spring member 156.

The squeeze fixing member 151 is mounted on the base member 64 of the lateral sealing mechanism 17 that supports the seal jaw 51. The squeeze fixing member 151 includes a protrusion 151*a* with pins for supporting the ends of the parallel link members 153 and the spring member 156.

Figure 15:
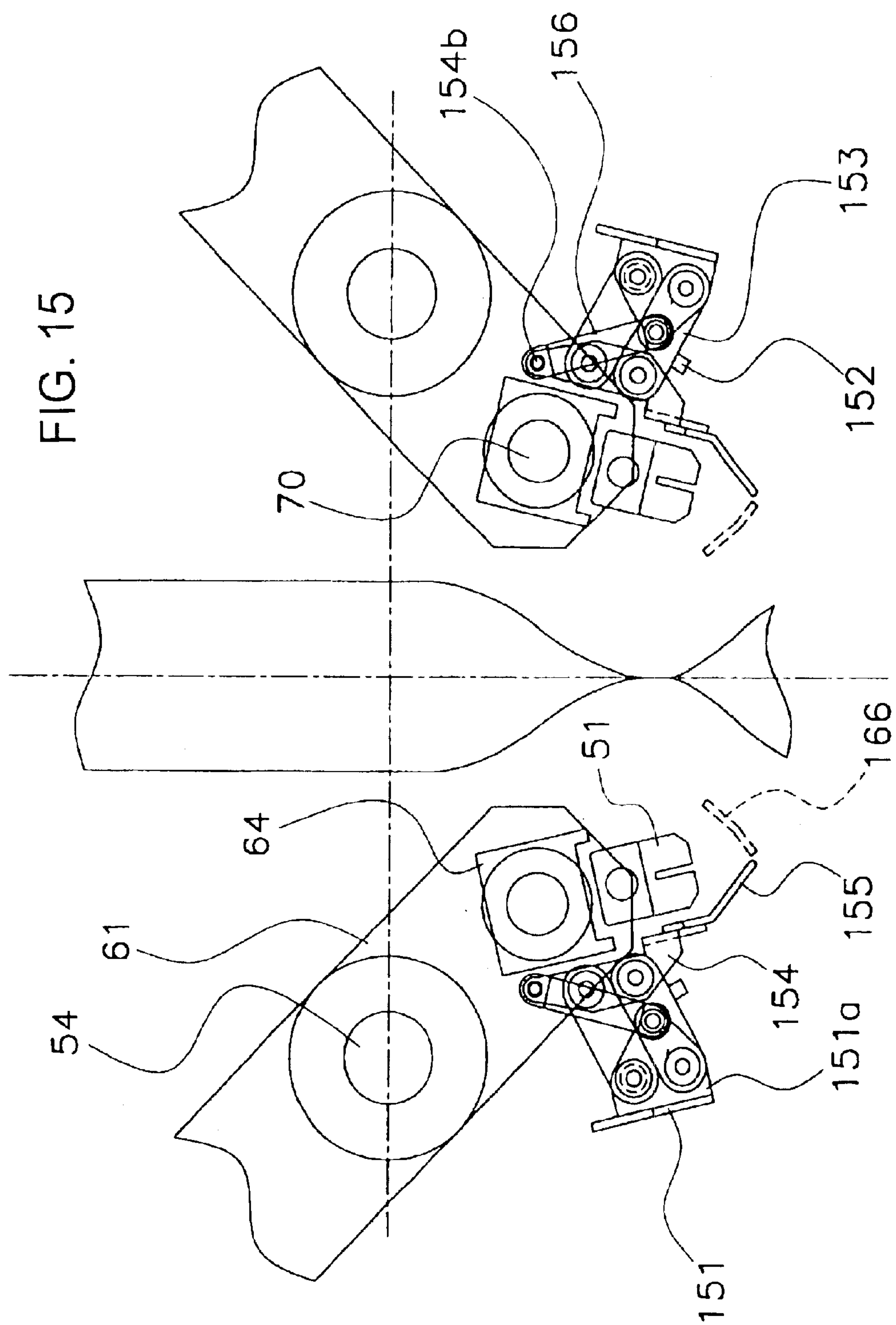
FIG. 15 is a schematic view explanatory of a movement of the squeezing mechanism in the lateral sealing operation.

The stopper 152 is fixed with respect to the base member 64 of the lateral sealing mechanism 17. The stopper 152 serves, as can be seen in FIG. 15, for stopping the squeeze moving member 154, which is intended to move in a direction away from the rotary shaft 54 due to the tensile force of the spring member 156. As will be described below, when each of the squeeze abutting members 155 in the pair of squeezing mechanisms 150 pushes each other, the stopper 152 will be inactivated.

The parallel link members 153 are paired members that are disposed apart from one another in the longitudinal direction of the seal jaw 51. One end of each member is pin-supported with a protrusion 151*a* of the squeeze fixing member 151. Another end is pin-supported with a pin-supporting portion 154_b_ of the squeeze moving member 154. These parallel link members 153 allow the squeeze moving member 154 to move so as to maintain an approximately constant posture in relation to the squeeze fixing member 151. (See FIGS. 10, 14, and 15.)

Figure 10:
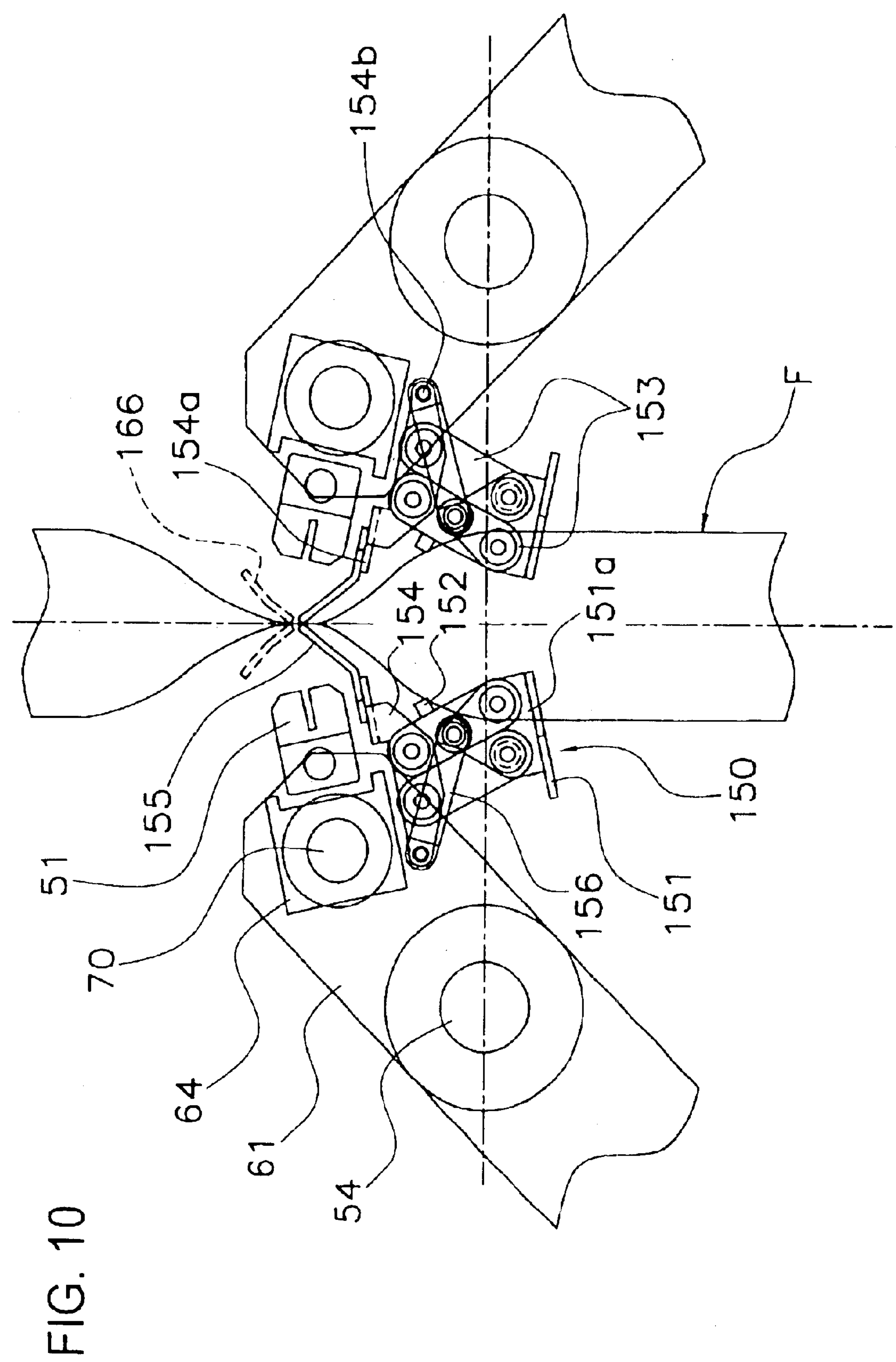
FIG. 10 is a schematic view of a squeezing mechanism usable with the bag making and packaging machine.

The squeeze moving member 154 includes a middle part 154_a_ that extends across the width of the tubular film in a direction perpendicular to the view surface of FIG. 10, and plate portions formed on both ends of the middle part 154_a_. The plate portions on both ends of the squeeze moving member 154, as described above, pin-support an end of the parallel link member 153 at the pin-supporting member 154_b_. The plate portions of the squeeze moving part 154 also pin-support the end of the spring member 156 at the pin-supporting portion 154_b_ in the vicinity of the 19E rotary shaft 54.

Figure 14:
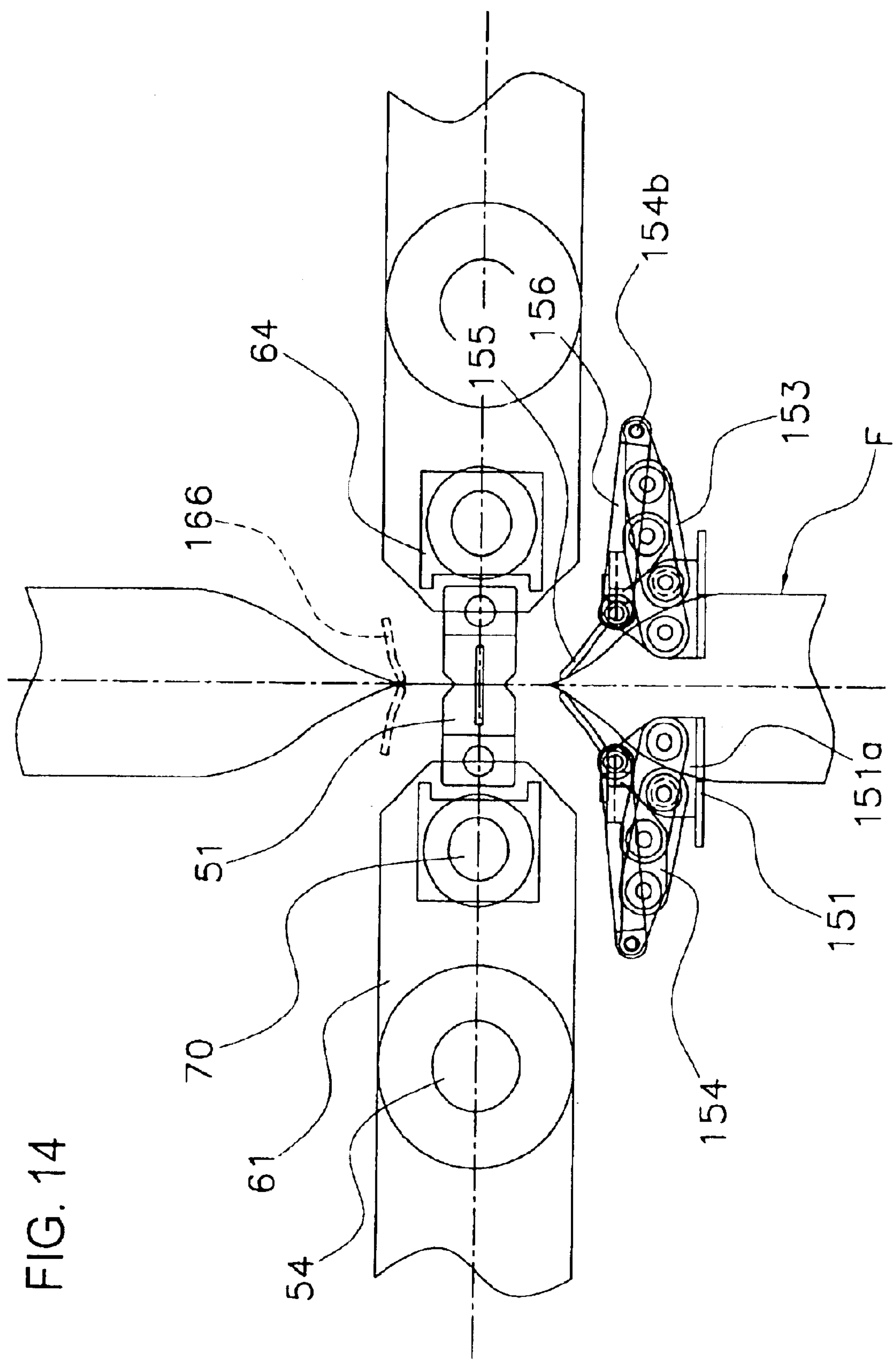
FIG. 14 is a schematic view explanatory of a movement of the squeezing mechanism in the lateral sealing operation.

The squeeze abutting member 155 is a member that extends across the entire width of the tubular film in the same manner as the seal jaw 51. The squeeze abutting member is fixed in the middle part 154_a_ of the squeeze moving member 154. The squeeze abutting member 155 engages, as shown in FIG. 10, the tubular film F before the seal jaw 51 and a shutter abutting member 166 (described later) to squeeze a sealing part of the tubular film F as shown in FIG. 14.

Figure 11:
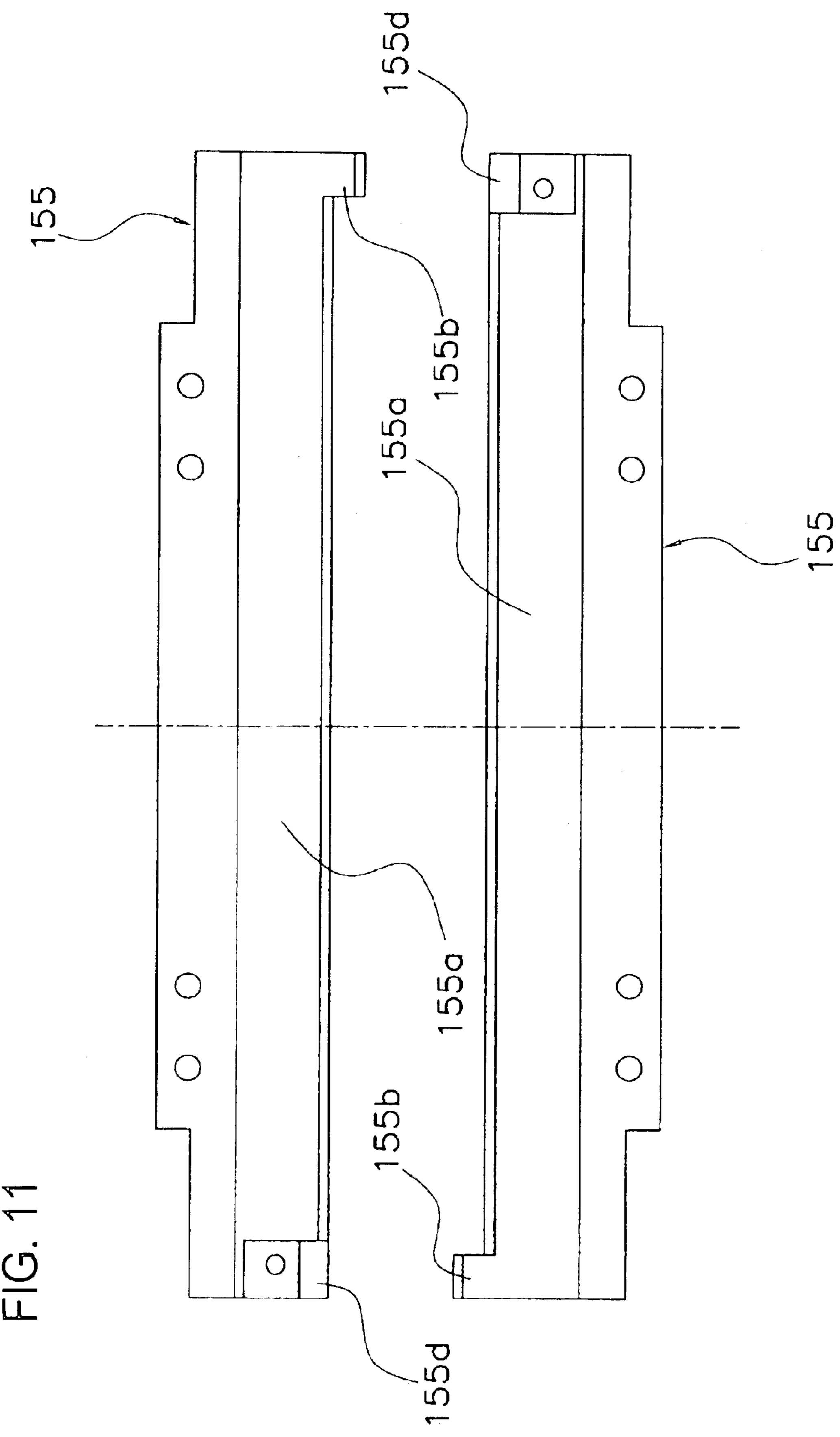
FIG. 11 is a top view of a pair of squeeze abutting members.
Figure 12:
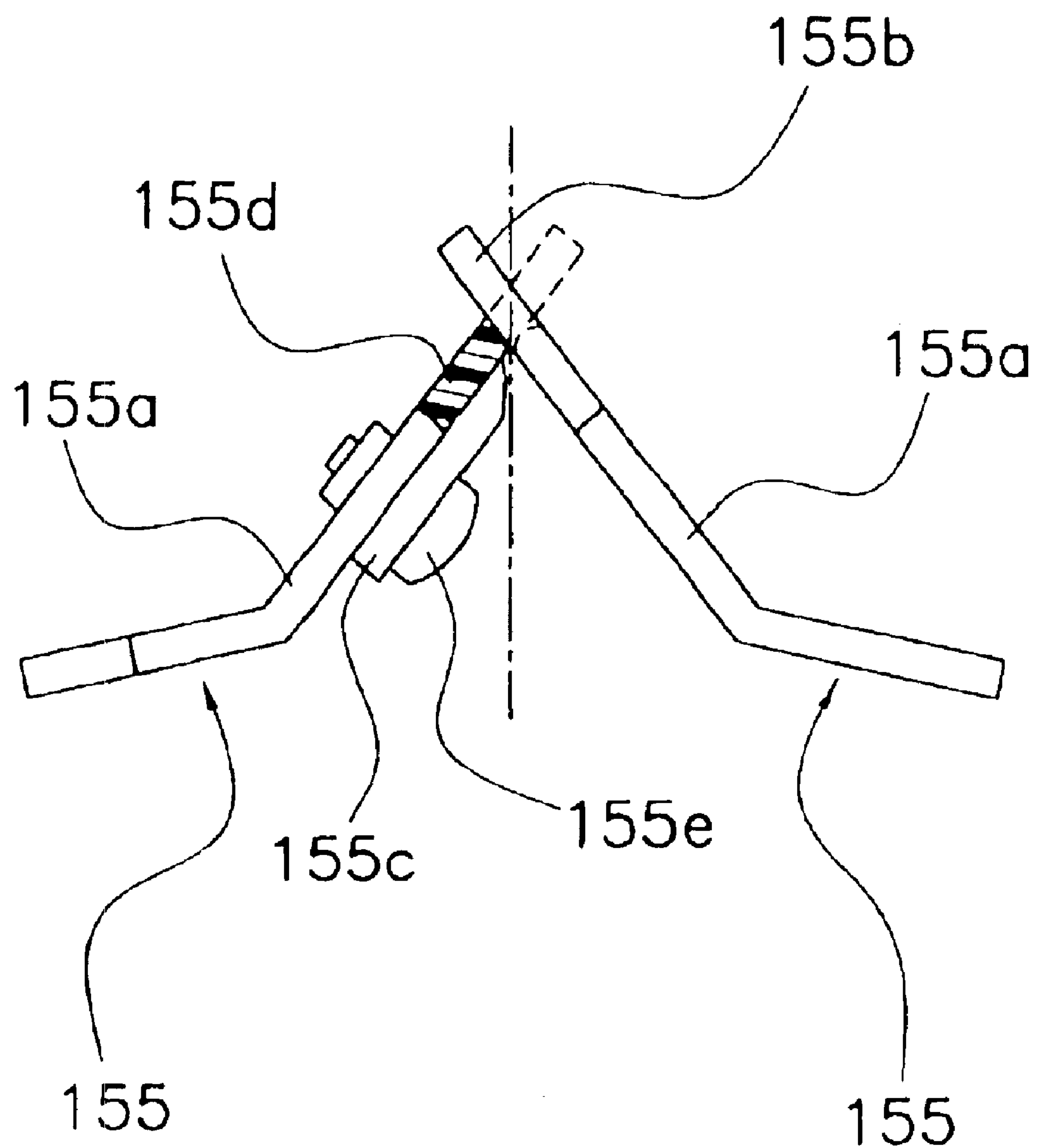
FIG. 12 shows a relationship between ends of a pair of squeeze abutting members in the configuration illustrated in FIG. 10.

FIG. 11 is a plan view illustrating the pair of squeeze abutting members 155 as they would appear just before the squeeze operation described just above and shown in FIG. 10. FIG. 12 is a detailed view illustrating the relationship between the ends of the pair of squeeze abutting members 155 just before squeeze operation depicted in FIG. 10. As the drawings illustrate, each of the squeeze abutting members 155 of the two squeezing mechanisms 150 has a metal body part 165_a_, which bears against the tubular film F, a metal protrusion 155_b_ which protruding at an outside end of the body portion 155_a_, a sliding member 155_c_ attached on the other end of the body portion 155_a_, and a resin part 155_d_ fixed on an end of the sliding member 155_c_. The protrusion 155_b_ is configured to engage with the opposite resin part 155_d_ of the squeeze abutting member 155 at the times before and after the lateral sealing, that is, in the states shown in FIGS. 10 and 14. (See also FIG. 12.) The sliding member 155_c_ is attached to the body part 155_a_ with a bolt (or screw) 155_e_ as shown in FIG. 12 and configured to slide to the side of the opposed squeeze abutting member 155. This configuration allows the size of the clearance between the body parts 155_a_ of the opposing pair of squeeze abutting members 155 to be adjusted. The clearance between the pair of body parts 155 is set to, for example, one millimeter. The resin part 155_d_ is formed from resin or rubber to reduce the noise that would otherwise occur when the opposite squeeze abutting member 155 contacts with protrusion 155_b_. The tip of the resin part 156_d_ is rounded, moreover, to allow it to follow the relative position changes of the two squeeze abutting members 155.

One end of the spring member 156 is pin-supported with the protrusion 151_a_ of the squeeze fixing member 151, and the other end is pin-supported by a pin-supporting portion of the squeeze moving member 154 in the vicinity of the rotary shaft 54. The spring member 156, as FIG. 14 illustrates, urges the squeeze moving member 154 and the squeeze abutting member 155 to push against the opposite squeezing mechanism 150 side. In this configuration, the pair of squeeze abutting members 155 contact one another with the protrusion 155_b_ and the resin part 155_d_ bearing upon one another at both ends with a predetermined clearance maintained between the opposed body parts 155_a_.

Each of the above-described members except for the squeeze moving member 154 and the squeeze abutting member 155 of the squeezing mechanism 150 is paired, with a matching element on each end of the squeeze abutting member 155.

Figure 13:
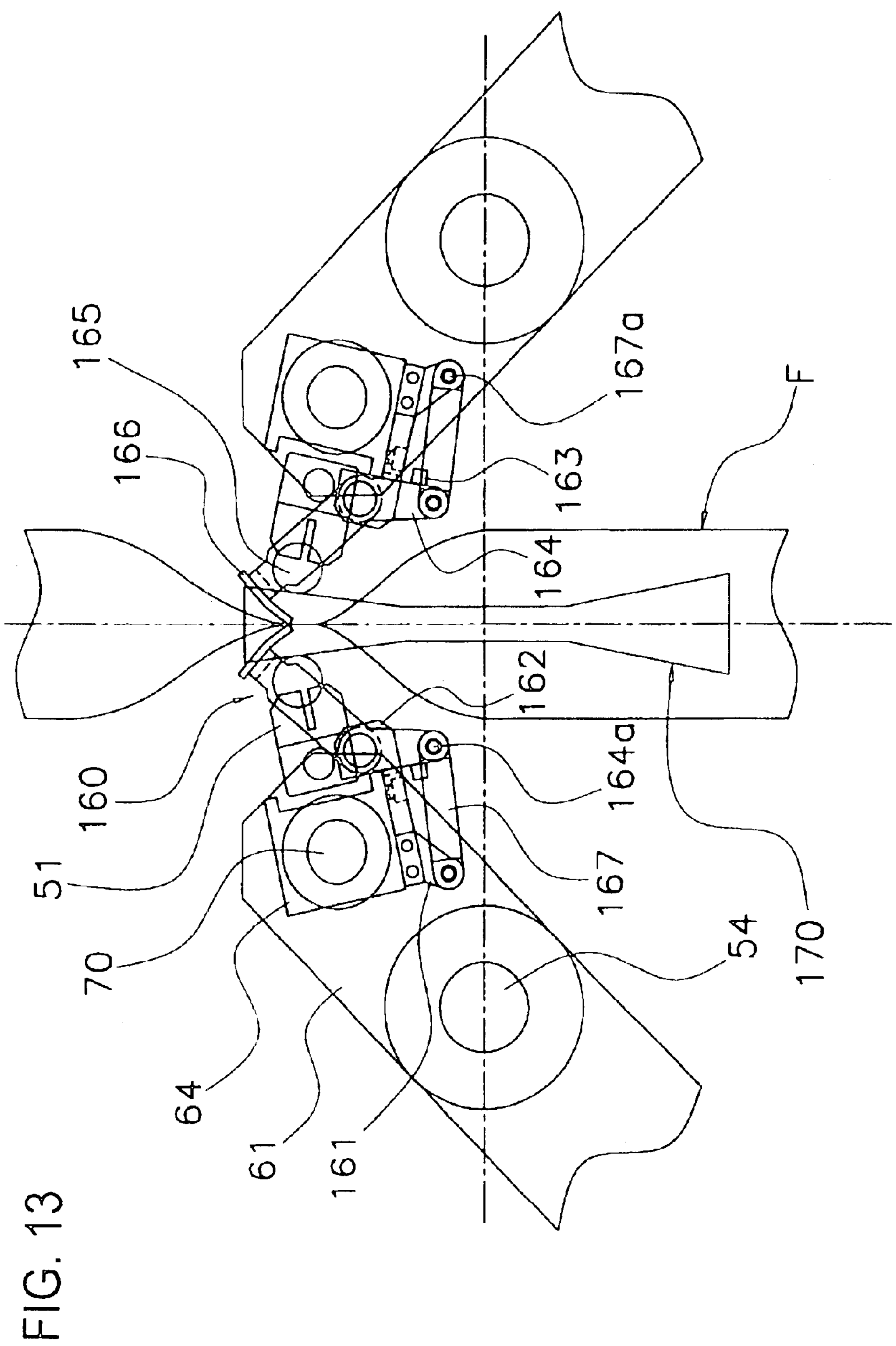
FIG. 13 is a schematic view of a shutter mechanism.

The shutter mechanism 160 includes a pair of right and left mechanisms. These mechanisms are mounted on the base members 64 of the lateral sealing mechanism 17, which rotate opposite directions. (See FIG. 13.) Each side of the shutter mechanism 160 includes shutter fixing members 161 and 162, a stopper 163, a V-member 164, a shutter guide follower 165, a shutter abutting member 166, and a spring member 167. In this embodiment, the bag making and packaging machine includes a shutter guide 170 for guiding the shutter guide follower 165 before and after formation of the lateral seal. The shutter guide 170 has an outer surfaces that include inclined planes as shown in FIG. 13, so that the clearance between the two shutter abutting members 166 is not changed as the shutter abutting members 160 move together during the lateral sealing operation.

The shutter fixing members 161 and 162 mounted on the base member 64 of the lateral sealing mechanism 17, which supports the seal jaw 51. The end of the spring member 167 is pin-supported on the shutter fixing member 161, and the middle part of the V-member 164 is pin supported on the shutter fixing member 162.

Figure 17:
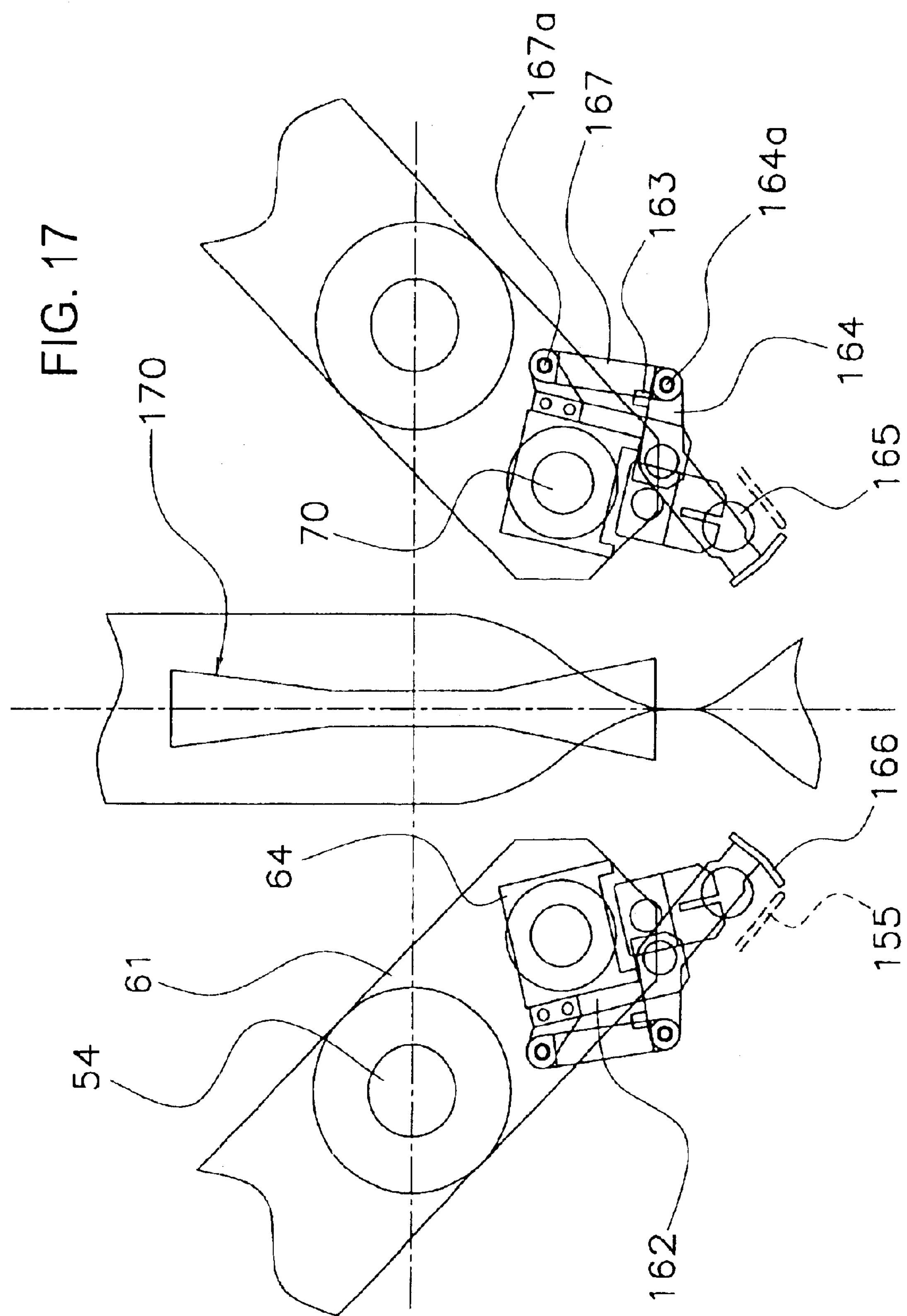
FIG. 17 is a schematic view explanatory of a movement of the shutter mechanism in the lateral sealing operation.

The stopper 163 is also fixed to and so incapable of moving relative to the base member 64 of the lateral sealing mechanism 17. The stopper 163 serves, as FIG. 17 illustrates, to stop the V-member 164 tends to rotate due to the tensile force of the spring member 167. As is described in more detail below, when a force from the shutter guide 170 acts on the shutter guide follower, the spring member 167 is extended, and the stopper 163 is inactivated.

The V-member 164 is pin-supported at its middle part on the shutter fixing member 162. The shutter abutting member 166 is fixed at one end of the V-member 164. The shutter guide follower 165 is rotatably attached in the vicinity of the fixed portion of the shutter abutting member 166. The shutter guide follower 165 rolls along and follows the outer surface of the shutter guide 170 as shown in FIG. 13, and before, during, and after the formation of the lateral seal. This maintains an approximately constant clearance between the two shutter abutting members 166 during the sealing operation. (See FIGS. 13 and 16.) An end of the spring member 167 is pin-supported on the end 164_a_ of the V-member 164 on the side of the V-member opposite the shutter abutting member 166.

The shutter abutting member 166 extends across the entire width of the tubular film in generally the same manner as the seal jaw 51. Both ends of the shutter abutting member 166 are fixed to a tip of a V-member 164. The shutter abutting member 166 engages the tubular film F before the seal jaw 51 does. The shutter abutting member thus prevents material from falling into the sealing region. At about the same time, the squeeze abutting member 155 squeezes material downward and out of the sealing region so that the region is clear and free of the packaged material when the sealing heads engage the tubular film. (See FIG. 16.)

Figure 16:
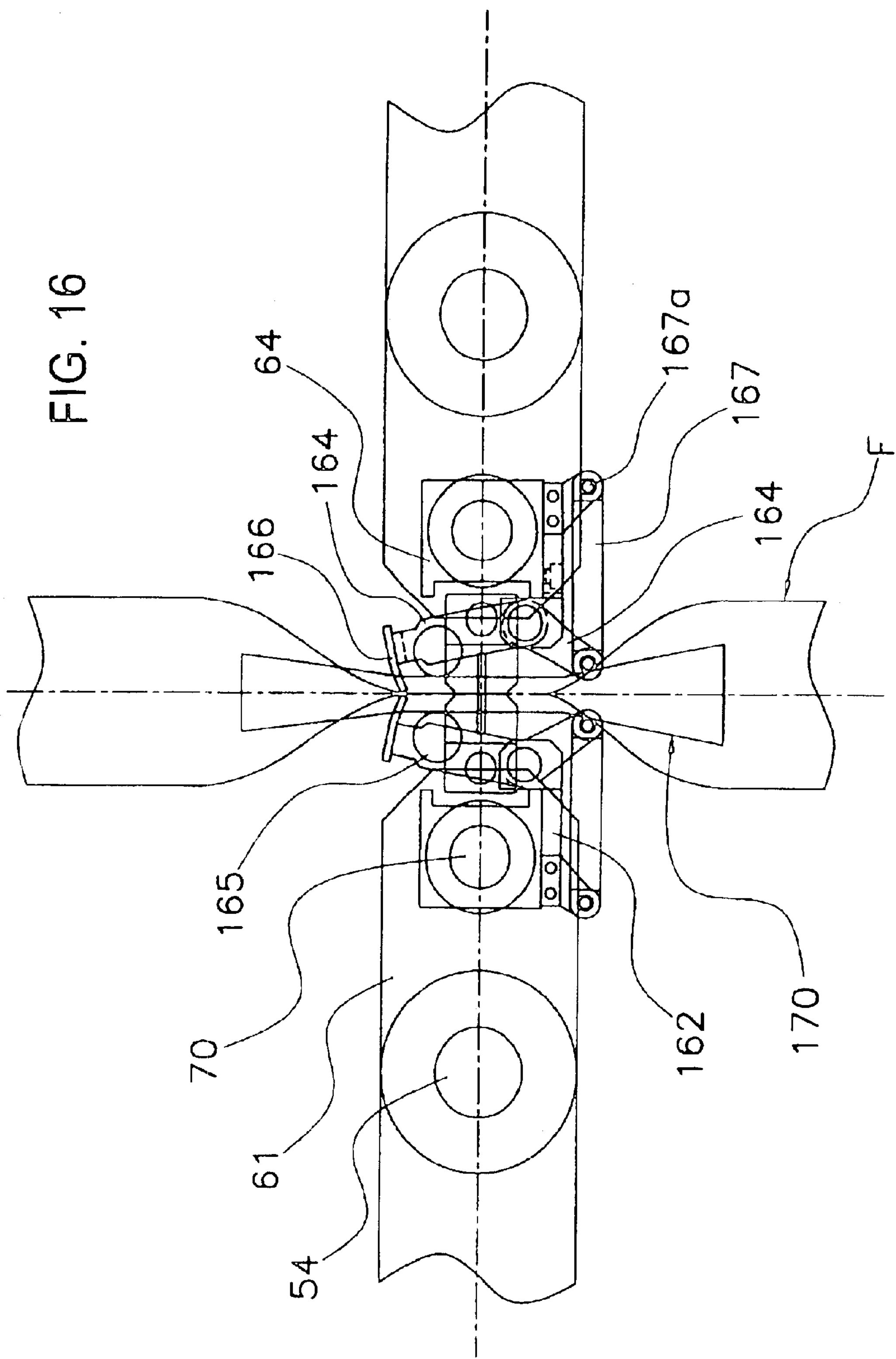
FIG. 16 is a schematic view explanatory of a movement of the shutter mechanism in the lateral sealing operation.

One end of the spring member 167 is fixed to the shutter fixing member 161 with a pin 167_a_, and the other end is pin-supported on the end 164_a_ of the V-member 164. As FIG. 16 illustrates, the spring member 167 pulls against the end 164_a_ of the V-member 164 and thereby urges the shutter guide follower 165 against the shutter guide 170 during the lateral seal's formation.

In the lateral sealing mechanism 17, the rotary shaft 54 is driven by a motor (not shown). The hinging members 62 and the rotary shaft supported therewith through the connecting member 61 thus rotate about the rotary shaft 54. The base members 64 and the seal jaws 51 are thereby supported by the hinge member 62 and driven to move around the cam 52 as the shaft 54 rotates.

The squeezing mechanism 150 and the shutter mechanism 160 are supported on the base member 64 and rotate likewise around the rotary shaft 54 in basic synchrony with the seal jaw 51. The squeeze abutting member 155 of the squeezing mechanism 150 and the shutter abutting member 166 of the shutter mechanism 160 are each connected to the base member 64 through the parallel link members 153 or the V-members 164, though, and thus move at speeds somewhat different than that of the seal jaw 51 just before and after the lateral seal is formed.

FIG. 10 shows the machine's configuration just before the sealing process. The seal jaws 51 have not yet been brought to bear against the tubular film F, but the squeeze abutting members 155 have already contacted the film. In FIG. 13, likewise, the seal jaws 51 are not in contact with the tubular film F, but the shutter abutting members 166 are abutting the film. For clarity, each mechanism is illustrated here in a separate drawing, FIGS. 10 and 13. In FIGS. 14 and 16 the seal jaws 51 have been brought into opposed contact across the tubular film F to heat seal the film. FIGS. 15 and 17 show the mechanisms' configuration after the heat sealing is completed and as the mechanisms move away from the tubular film F.

As described above, during the lateral sealing operation the cams 52 and the rotary shafts 54 are moved laterally according to controls from a control section (not shown). The control section controls a motor for the lateral drive mechanism, and this mechanism moves the cams 52 and the rotary shafts 54 laterally based on the rotation of ball screw 80.

More specifically, the two cams 52 and two rotary shafts 54 are moved quickly toward each other immediately before the tubular film F is engaged between the seal jaws 51. After the heat seal is complete the cams 52 and shafts 54 are then moved quickly away from one another and away from the film. At the same time, the two squeeze abutting members 155 maintain a clearance between them by engagement between the protrusion 155*b* on one side and the resin part 155*d* on the other. A clearance is also kept between the shutter abutting members 166 of the shutter mechanism 160 by the movement of the shutter guide followers 165 over the shutter guide 170. The clearances between the squeeze abutting members 155 and between the shutter abutting members 166 are held approximately constant as the lateral seal is formed.

As a comparison of FIGS. 10 and 14 will illustrate, the squeeze abutting members 155 and the shutter abutting members 166 (see FIG. 10) first come into contact with the tubular film at about the same point. By the time the seal jaws 51 come to bear against the tubular film F to begin forming the seal, though, the squeeze abutting members 155 have moved downward and away from the shutter abutting members 166 (see FIG. 14). During this time, the ends of the squeeze abutting members 155 move downward along the film faster than the speed of the seal jaw 51. This change in relative position is due to the change in configuration of the parallel link members 153. The movement of the squeeze abutting members 155 clears the packaged material downward and out of the sealed region. The squeeze abutting member 155 thus moves downward relative to the seal jaw 51. At the same time, the ends of the shutter abutting members 166 move downward at a speed somewhat slower than that of the seal jaw 51 as the V-member 164 rotates. The shutter abutting member 166 moves upward relative to the seal jaw 51 (though still downward absolutely).

In the bag making and packaging machine described here, rotation of the rotary shaft 54 is controlled by a control section (not shown) during the lateral sealing operation, and the rotation speed of the seal jaw 51 and the squeeze abutting member 155 varies. More specifically, the control section drives rotation of the rotary shaft 54 at a high speed during between a time when the pair of seal jaws 51 and squeeze abutting members 155 are positioned away from one another as shown, e.g., in FIG. 10 and the start of heat sealing by the seal jaws 51. The rotary shaft is then driven at a relatively low speed while the tubular film F is engaged between the pair of seal jaws 51 and the heat seal formed. The shafts are then rotated at a high speed again after the heat seal is completed and the pair of seal jaws 51 move apart from one another. This allows high speed processing, provides squeezing of the tubular film F between the squeeze abutting members 155, and prevents of the tubular film F from catching on the shutter abutting members 166 after the seal is completed, while also allowing adequate time to the heat seal. These movements, in association with the mutual alignments of the seal jaws 51 and the lateral motions and positional changes of the squeeze abutting members 155 and the shutter abutting members 166 as driven by the cams 52 and the rotary shafts 54, provide for high speed bag making and packaging and a reduction in sealing failures.

In the lateral sealing operation described above, the squeeze abutting members 155 move the packaged material downward before the seal jaws 51 begin forming the heat seal. This reduces the problem of material being caught in the heat seal region and thereby decreases failures in the heat seal operation. Furthermore, since the squeeze abutting members 155 of the squeezing mechanism 150 are mounted on the base members 64 of the lateral sealing mechanism 17, other, separate squeezing mechanisms are not required, and the apparatus can thus be made smaller and more compact than might otherwise be the case.

After contacting the tubular film F before the seal jaws 51, as shown in FIG. 10, the ends of the squeeze abutting members 155 move downward at a speed somewhat greater than that of the seal jaws 51. This increases the distance along which the squeeze abutting members squeeze the tubular film in the sealing region, and reduces the tendency of the packaged material to be caught in the sealed region.

The shutter abutting members 166 restrain packaged material from entering the sealing region from above. (See FIG. 16.) This further reduces the tendency of the packaged material to be caught in the sealed region. Since the shutter abutting members 166 of the shutter mechanism 160 are mounted on the base member 64 of the lateral sealing mechanism 17, other shutter mechanisms are not required and the apparatus can be made smaller and more compact than would otherwise be the case.

After contacting the tubular film F before the seal jaws 51 as shown in FIG. 13, the ends of the shutter abutting members 166 move downward more slowly than the seal jaws 51. This protects against the packaged material falling into and entering the sealed region as the seal is formed as shown in FIG. 16.

As shown in FIGS. 15 and 17, after the seal is formed the seal surfaces of the seal jaws 51 tilt downward and away from the tubular film F. The squeeze abutting members and the shutter abutting members also move at the same rapidly away from the tubular film F. Adherence or catching of the tubular film F on the shutter abutting members or the other parts can be almost entirely eliminated, therefore, even in very high speed bag making and packaging.

Before the lateral seal is formed, the squeeze abutting members 155 and the shutter abutting members 166 (see FIG. 10) move quickly away from one another while still maintaining close contact with the tubular film F. This establishes a cleared region (see FIG. 14) in which the sealing jaws 51 engage the tubular film F to form the heat seal. This provides a clear sealing region and prevents entry of the packaged material into the sealing region as the lateral seal is formed.

In the bag making and packaging machine described here, the rotary shafts 54 are rotated at a high speed while the seal jaws and squeeze abutting members are not in contact with the tubular film F until the machine reaches the configuration illustrated in FIG. 10. The rotary shafts 54 then rotate at a relatively low speed while the tubular film F is gripped between the seal jaws 51 and the heat seal is formed. The shafts are then rotated at a high speed once again after the heat seal is complete, and the seal jaws 51 once again move apart from one another. This control, combined with the movement of the various parts and in particular the lateral movement of the cams 52 and the rotary shafts 54, allows for overall high speed processing, squeezing of the tubular film F between the squeeze abutting members 155 for a sufficient distance, and the avoidance of catching or adherence of the tubular film F on the shutter abutting members 166 after the seal is formed. prevention of catching the tubular film F on the shutter abutting member 166 after sealing. The machine can thus provide high speed bag making and packaging with reliable sealing with a low incidence of sealing failures.

Moving the cams and rotary shafts in the lateral direction, in particular, allows the construction of a general-purpose mechanism capable of rapid operation with enlarging the mechanism itself. This configuration, moreover, reduces the need for sliding contact between the cams and other parts of the mechanism, thereby improving the durability of the cams. Also, since the sealing parts are tiltable with respect to the bag material, damage can be avoided both to the packaged material and the sealing parts, even if a piece of the packaged material is caught between the heads.

FIGS. 18–25 show an alternative embodiment of a bag making and packaging apparatus. The machine of this embodiment is similar in broad respects to the one described above, differing mainly in some of the details of its construction.

Figure 18:
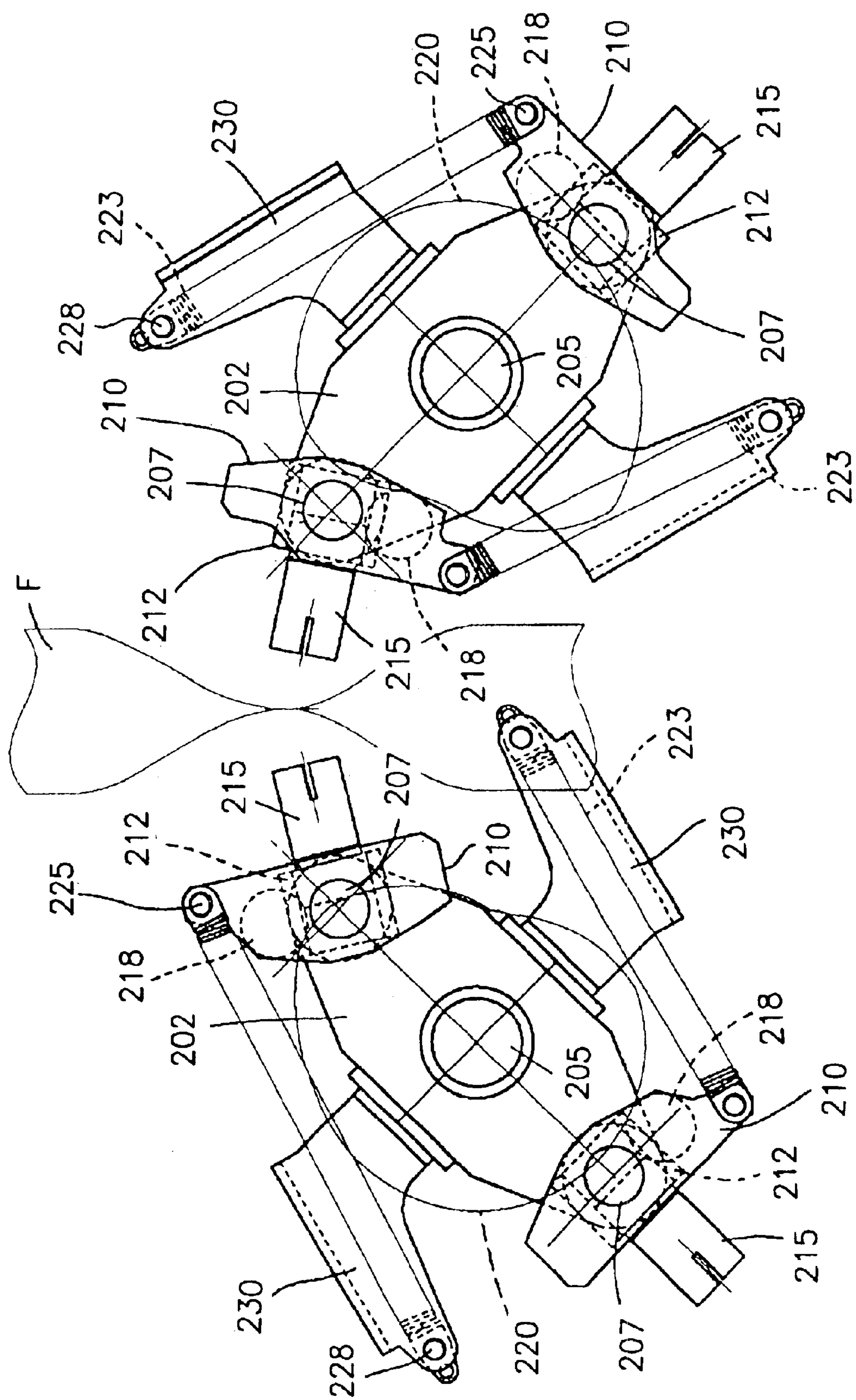
FIG. 18 is a side view illustrating parts of a second embodiment of a sealing and packaging machine.

Referring now to FIG. 18, this embodiment includes a pair of left and right side connecting members 202, one on each side of the tubular film F. The connecting members 202 rotate around a pair of rotary shafts 205. The motions of the connecting members 202 are synchronized so that the connecting members rotate around the shaft 205 in opposite directions in mutual opposition to one another.

Each connecting member carries, at each of its two ends, a hinging shaft 207. A hinging member 210 rotates about the hinging shaft 207, with a base member 212 fixed to the hinging member. A sealing head 215 is fixed to the base member 212 so that the sealing head is hinged to the connecting member 202 through the hinging member 210 and the hinging shaft 207.

Rotation of the sealing head is controlled by a cam follower 218, which tracks around the periphery of a cam 220. Contact is maintained between the cam follower 218 and the cam 220 by a tension spring 223. The tension spring 223 extends between a first pin 225 on the hinging member 210, and a second pin 228. The second pin is mounted on a bracket 230, which is in turn mounted onto the side of the connecting member 220.

Figure 19:
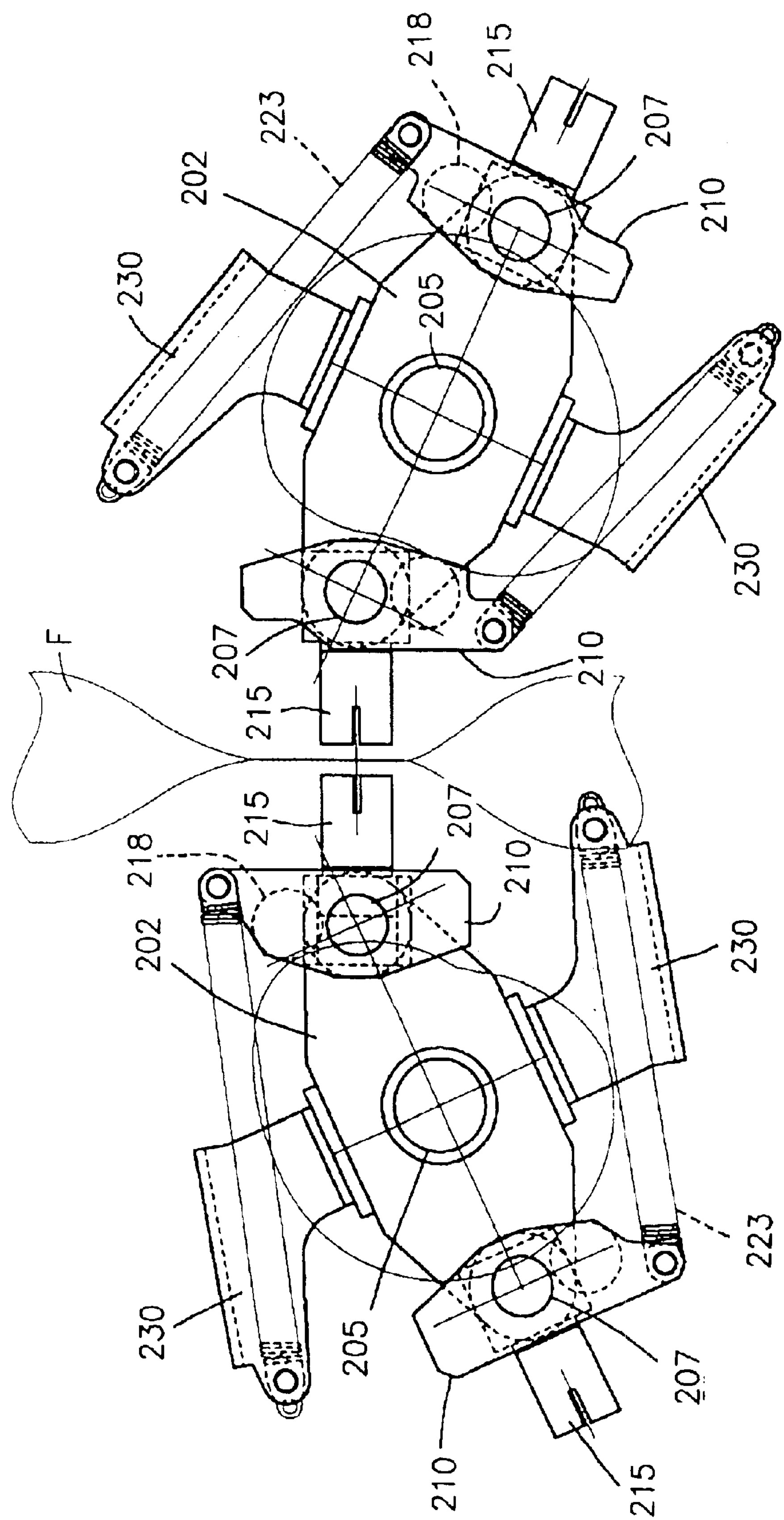
FIG. 19 is a view of the machine at a point somewhat later in time than that of FIG. 18.

FIG. 18 shows the configuration of the sealing heads 215 before they engage the tubular film F. FIG. 19 shows the sealing heads' configuration somewhat later, at an instant just before the film is engaged. The profile of the cam 220 is such that mutually aligned opposition is maintained between the sealing heads during the fill period of their engagement with the film. This allows the sealing heads to have flat sealing faces, which allows the formation of a seal with a significant width, instead of the very thin seal that would result if the heads were to contact one another only along a line.

Figure 20:
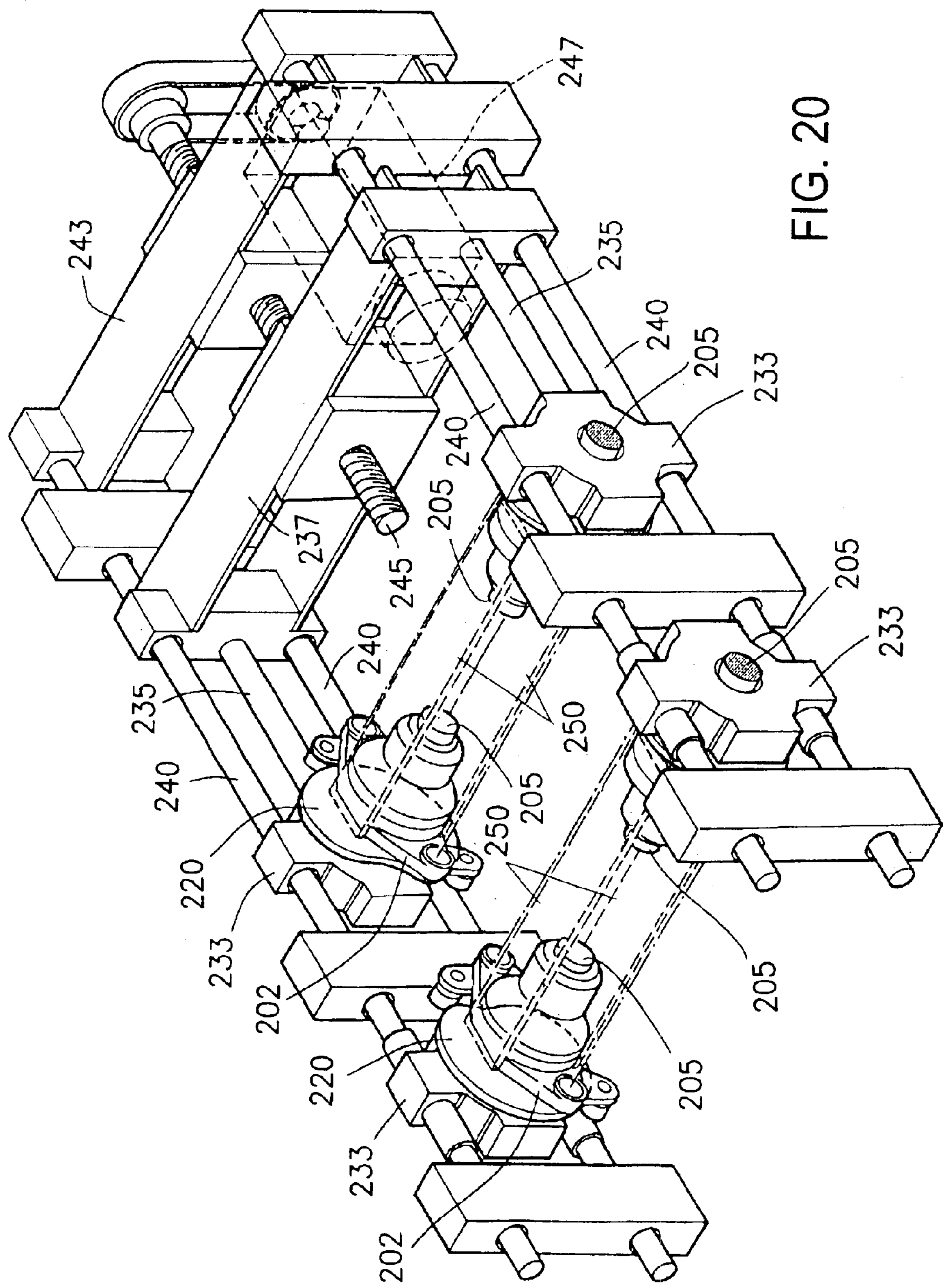
FIG. 20 is a perspective view of parts of the machine.

FIG. 20 is a perspective view of a lateral drive mechanism that drives the rotary shafts 205, the connecting members 202, and thus the sealing heads 215 back and forth in a lateral direction. Note that many of the machine's parts, including the sealing heads, are omitted from this view for clarity and ease of illustration.

Each rotary shaft 205, each cam 220, and each connecting member 202 is mounted to a carriage 233 of the lateral drive mechanism. A first pair of these carriages is fixed to a pair of first connecting bars 235. These first connecting bars 235 are in turn fixed to a first mobile beam 237.

A second set of connecting bars includes four connecting bars 240. These second connecting bars 240 are fixed at one end to a second mobile beam 243. The second connecting bars 240 extend through the first pair of carriages 233 but are not connected to them. The second connecting bars instead connect to the second set of carriages 233, which carry the mechanisms on the other side of the tubular film.

A turnbuckle 245 is driven by a motor 247. The turnbuckle 245 is in threaded engagement in opposite ways with the first and second mobile beams 237 and 243. The turnbuckle 245 may thus be driven by the motor 247 to drive the first and second mobile beams toward or away from one another depending on the turnbuckles's direction of rotation. As the first and second mobile beams are driven towards and away from each other, the carriages 233 on each side of the film are too, so that the distances between the shafts 205 and thus the sealing heads 215 can be controlled as desired to move the sealing heads through an appropriate path of travel, or locus.

Alignment beams 250 extend between the two connecting members 202 on each side of the film. For clarity, these alignment beams are shown in phantom lines in FIG. 20. The alignment beams 250 help to insure synchronized motion between the connecting members 202 on either side of the mechanism. Rotation of the shafts 205 and the connecting members 202 is driven by Schmidt-couplings (not shown), which connect to the shafts to power their rotation.

Figure 21:
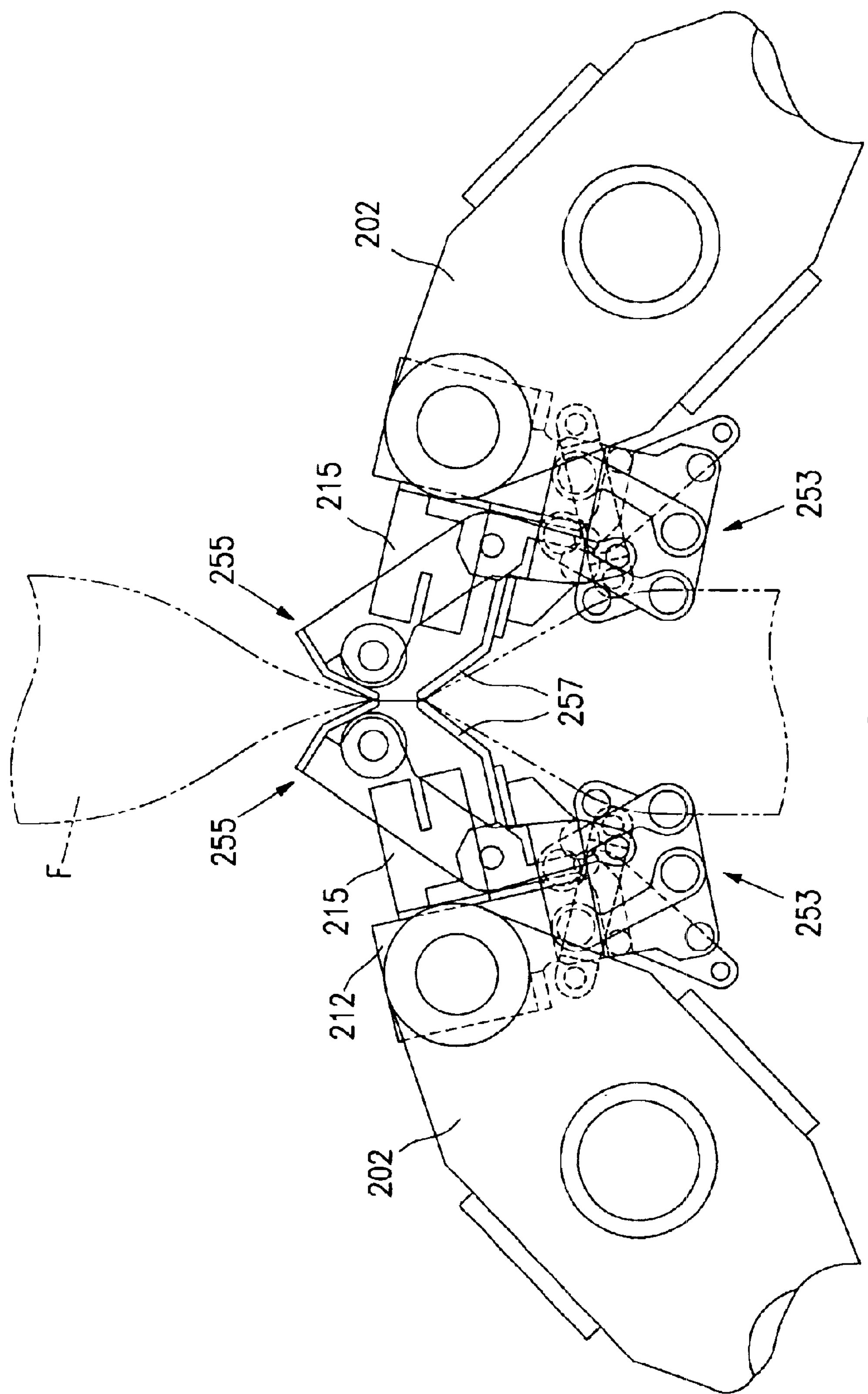
FIG. 21 is a side view illustrating the operation of the machine.
Figure 22:
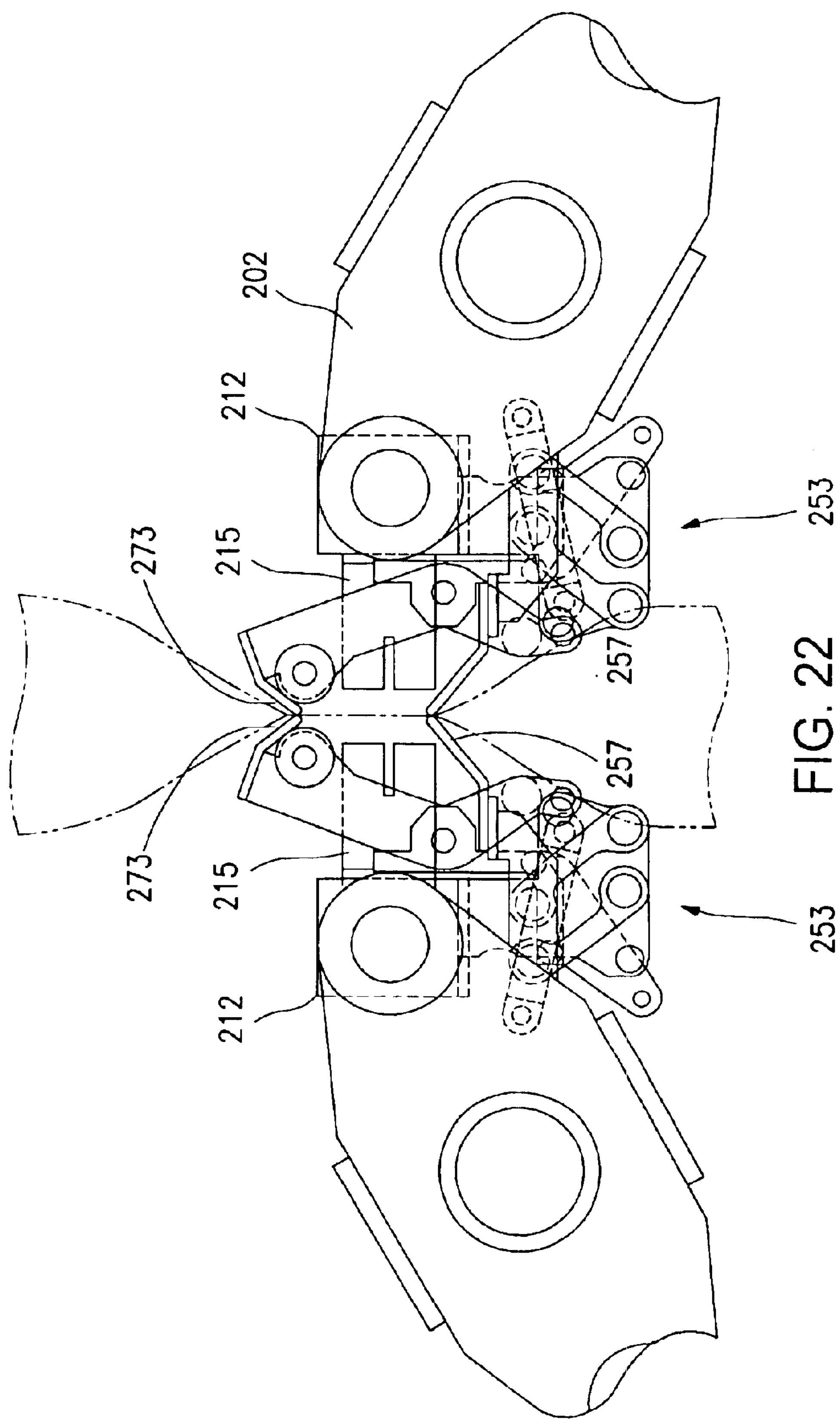
FIG. 22 is a side view illustrating the operation of the machine at a point somewhat later in time than that of FIG. 21.
Figure 23:
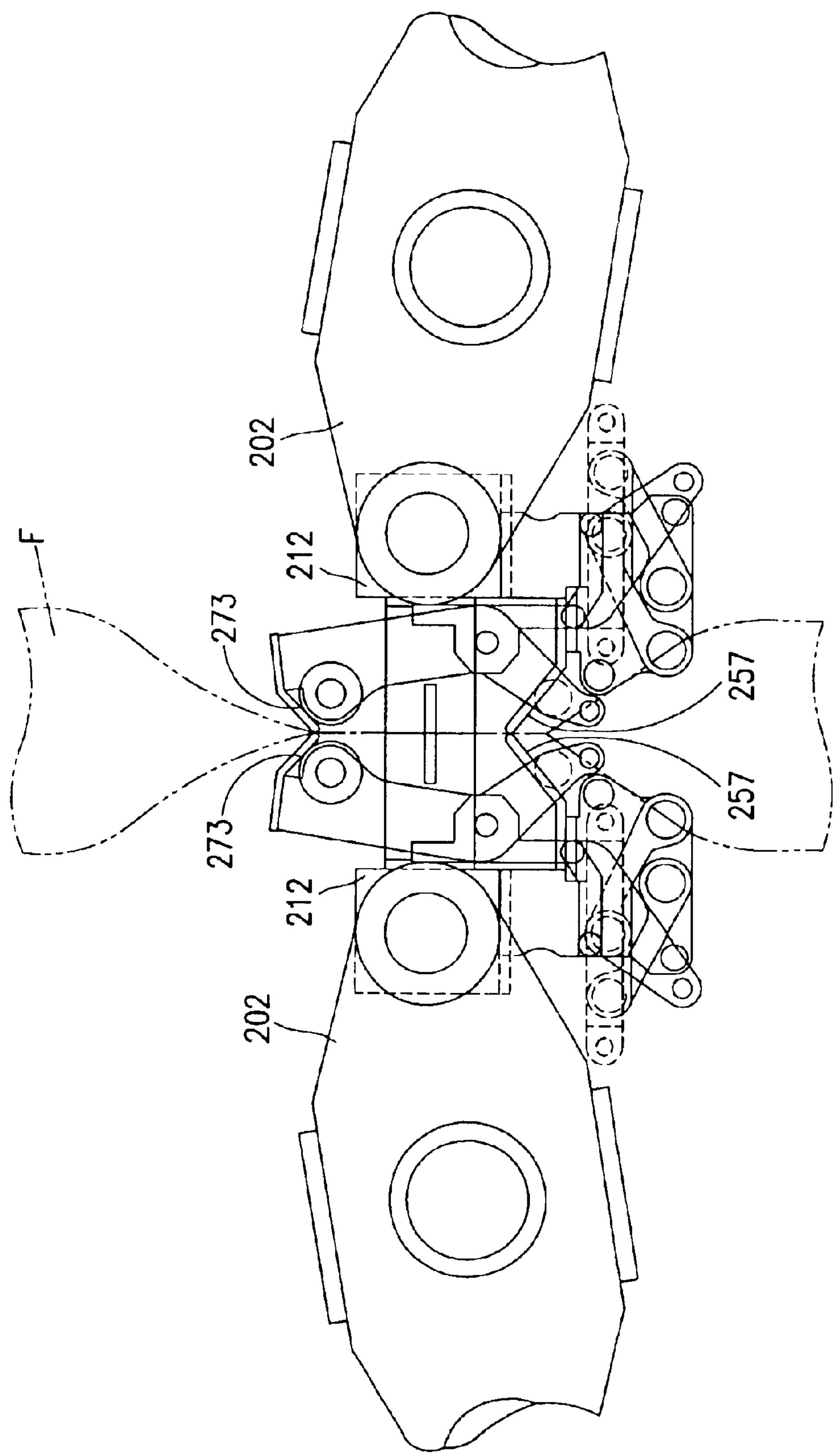
FIG. 23 is a side view illustrating the operation of the machine at a point somewhat later in time than that of FIG. 22.

FIGS. 21–23 illustrate how packaged material is cleared from the sealing region squeezing and shutter mechanisms on either side of the tubular film F. The sealing heads 215 are carried by base members 212. The base members carry, in addition, squeezing mechanisms 253 and shutter mechanisms 255. The squeezing mechanisms 253 and shutter mechanisms 255 cooperated to clear the packaged material from a sealing region and to prevent the entry of such material into the region before the sealing heads 215 engage the tubular film on either side of the sealing region.

The squeezing and shutter mechanisms in this embodiment act in a manner generally similar to that described above in connection with the prior embodiment. As FIG. 21 illustrates, the squeezing and shutter mechanisms first contact the tubular film at locations space apart somewhat, but relatively near to each other, on the tubular film F.

FIG. 22 illustrates a point in time later than the one illustrated in FIG. 21, but still before the sealing heads 215 have engaged the tubular film. At this time, one can see that the points of contact between the squeezing mechanisms and the tubular film on the one hand, and the shutter mechanisms and the tubular film on the other, have moved apart somewhat so that a vertical sealing region has been cleared of packaged material inside the tubular film. While the squeezing mechanism 253 presses the packaged material downward and out of the sealing region, the shutter mechanism presses the material upward and keeps more of the material from falling into the sealing region.

This continues until the time illustrated in FIG. 3, at which point the sealing heads 215 have engaged the tubular film F to begin heating and pressing the film to form the lateral heat seal that well be present at the top and bottom of each finished bag.

Figure 24:
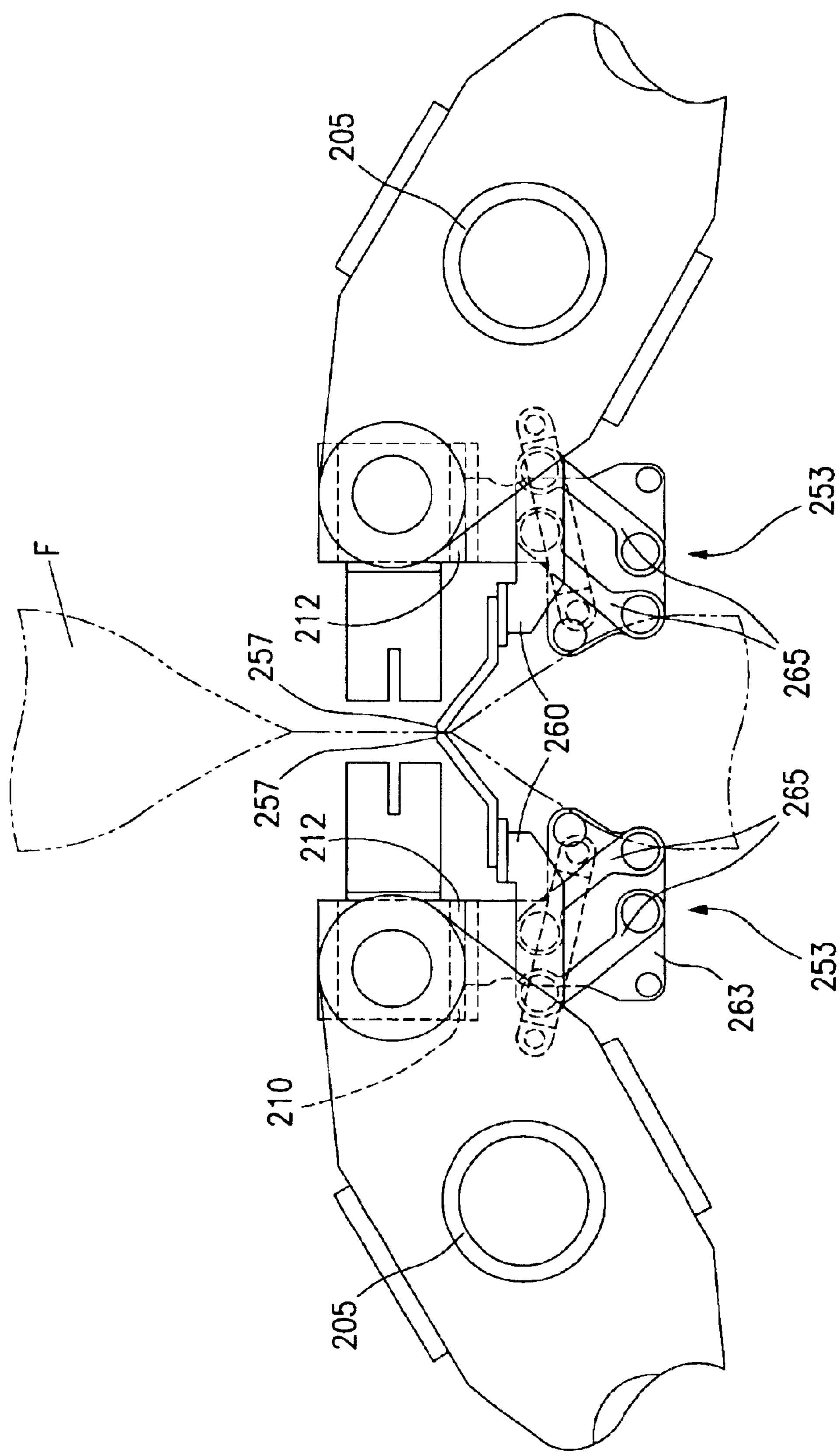
FIG. 24 shows details of a squeezing mechanism that forms a part of the machine.

FIG. 24 shows details of the squeezing mechanisms 253. The squeezing mechanisms 253 include a pair of mutually opposed squeeze abutting members 257. It is these members that make contact with the tubular film F on either side of the sealed region. The squeeze abutting members 257 are mounted on movable brackets 260. The movable brackets 260 are mounted in turn on fixed brackets 263 with linkages 265 between them to allow relative motion between the fixed and movable brackets. The fixed brackets are mounted onto the hinging members 210, which also carry the sealing heads 215. The squeeze abutting members 257 thus move with the sealing heads, but are also movable somewhat with respect to the sealing heads due to the freedom imparted by the presence of the extendable linkages 265. Tension springs urge the squeeze abutting members 257 outward and into mutually opposed contact as the squeeze abutting members move downward along the tubular film material F. As before, the squeeze abutting members 257 can be configured, e.g., by providing means equivalent to those illustrated in FIGS. 11 and 12 and described above, to maintain a predetermined clearance between the squeeze abutting members for receiving the tubular film. As in the previous embodiment, stoppers 270 limit the range of motion of the linkages 265 when the squeezing mechanism is not in contact with the tubular film.

Figure 25:
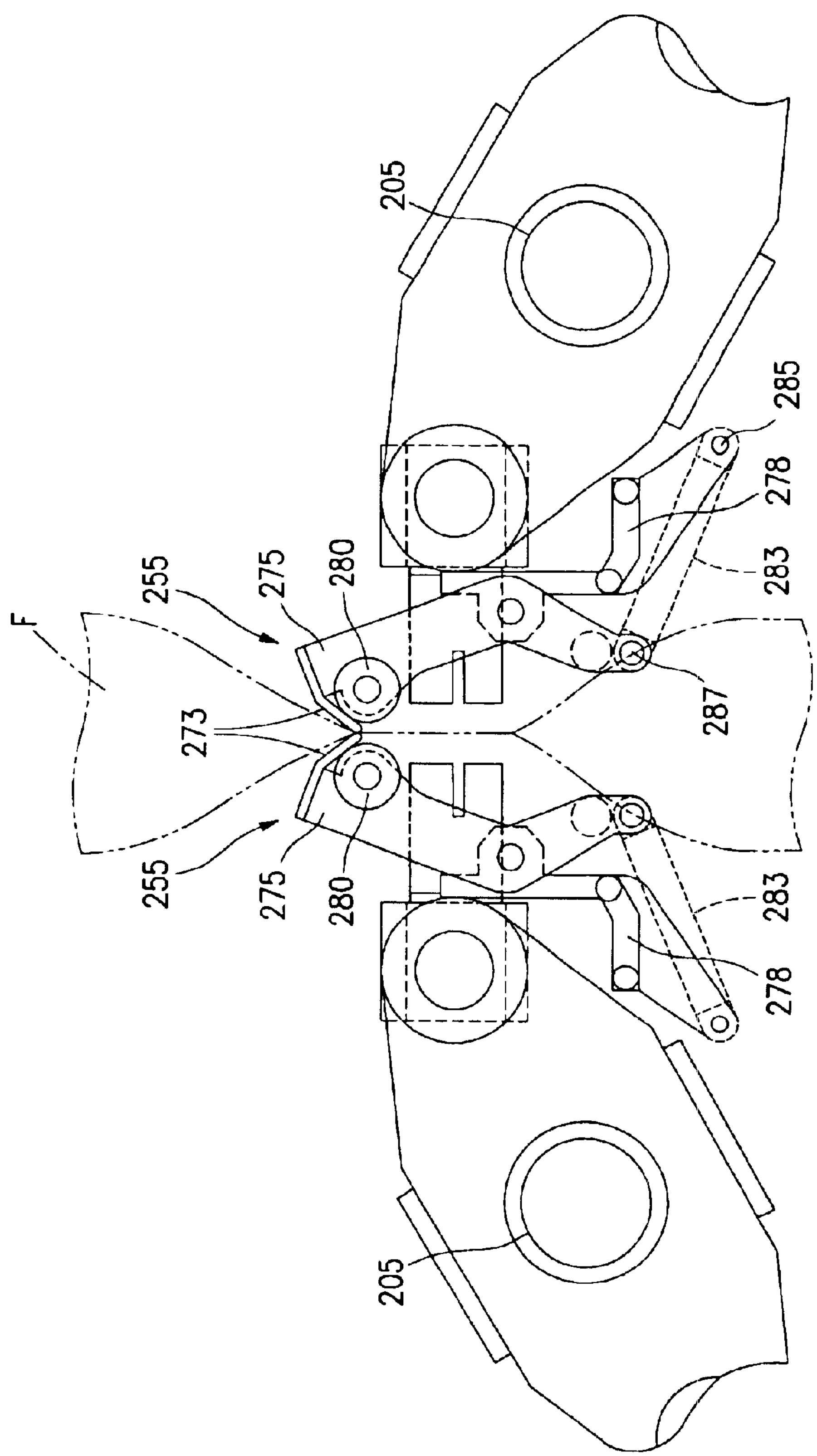
FIG. 25 shows details of a shutter mechanism included as a part of the machine.

FIG. 25 shows details of the shutter mechanisms 255. In this embodiment, the shutter mechanism 255 includes a pair of shutter abutting members 273, which engage against and close the tubular film F above the sealing region to clear the packaged material from the upper part of the sealing region and to prevent packaged material from falling into the sealing region before the seal is formed. The shutter abutting members 273 are mounted on V-shaped moving brackets 275, which are mounted in turn for rotation about fixed brackets 278. The fixed brackets 278 are mounted to the hinging members 210 that carry the sealing heads 215, so that the shutter mechanisms 255 are carried along with the sealing heads.

Shutter guide followers 280 bear against and roll over contact surfaces of a shutter guide (not shown), in much the same way as is described above in connection with the prior embodiment. Rolling contact between the shutter guide followers 280 and the associated surfaces of the shutter guide (not shown) is maintained by tension springs 283, which are mounted between first pins 285 on the fixed brackets 278, and second pins 287 on the V-shaped moving brackets 275.

Multiple embodiments for bag making and packaging machines have been described herein and illustrated in the accompanying figures. The invention is not limited to these exemplary embodiments, however, and various changes, modifications, and additions to these exemplary embodiments will no doubt occur to those of skill in these arts. The scope of the invention should not be limited to the foregoing discussions. The true breadth of the invention should be determined instead primarily by reference to the claims appended hereto, along with the full scope of equivalents to which those claims are legally entitled.

What is claimed is:

1. A lateral sealing mechanism for use in a bag making and packaging machine for filling a packaged material while sealing a tubularly shaped packaging material in longitudinal and lateral directions to make a bag, the sealing mechanism being adapted for sealing the packaging material in a lateral direction perpendicular to a transporting direction of the packaging material, the lateral sealing mechanism comprising:

a sealing element operable to contact the tubular packaging material to seal the packaging material in a lateral direction;

a cam having a cam face on a periphery thereof a support mechanism having a cam follower engageable with the cam face and supporting the sealing element, the support mechanism being movable so that the sealing element is contacted with and separated from the packaging material;

a rotary shaft for rotating the support mechanism about a center of rotation thereof and a lateral direction drive mechanism for moving the cam and the rotary shaft together in a direction perpendicular to the axis of the rotary shaft during the rotation of the support mechanism.

2. A lateral sealing mechanism as recited in claim 1, wherein the support mechanism is rotated as the cam follower moves along the cam face of the cam.

3. A lateral sealing mechanism as recited in claim 1, wherein the support mechanism supports the sealing element tiltably with respect to the packaging material.

4. A lateral sealing mechanism as recited in claim 3, wherein the support mechanism includes:

a connecting member connected to the rotary shaft;

a hinging member supporting the sealing element and having one end hingeably supported by the connecting member and the other end supporting the cam follower; and an urging member configured to press the cam follower supported on the hinging member against the cam face.

5. A lateral sealing mechanism as recited in claim 1, wherein the lateral direction drive mechanism drives reciprocation of the cam and the rotary shaft in a lateral direction while the sealing element is opposed to the packaging material.

6. A lateral sealing mechanism as recited in claim 1, and further comprising a squeezing part supported on the support mechanism, wherein the squeezing part is operable to contact the tubular packaging material before the sealing element and to force the packaged material downward inside the tubular packaging material.

7. A lateral sealing mechanism as recited in claim 6, wherein the squeezing part is supported on the support mechanism and operable to move downward at a speed faster than that of the sealing element for at least a part of the time during which it is in contact with the tubular packaging material.

8. A lateral sealing mechanism as recited in claim 1, and further comprising a shutter part supported on the support mechanism and operable to contact tubular packaging material before the sealing element to restrain the material to be packaged from entering into a sealing region of the tubular packaging material.

9. A lateral sealing mechanism as recited in claim 8, wherein the shutter part is supported on the support mechanism and operable to move downward at a speed slower than that of the sealing element for at least a part of the time during which it is in contact with the tubular packaging material.

10. A lateral sealing mechanism as recited in claim 1, and further comprising a control section operable to control the rotational speed of the rotary shaft to change the circular movement speed of the support mechanism before and after heat sealing by the sealing element.

11. A lateral sealing mechanism as recited in claim 1, wherein a plurality of the support mechanisms are provided for a single rotary shaft.

12. A lateral sealing mechanism according to claim 1, wherein the lateral direction drive mechanism, comprises:

a lateral direction drive mechanism for moving the cam and the rotary shaft together in a direction perpendicular to the rotary shaft during the rotation of the support mechanism to cause the sealing element to move in the lateral direction.

13. A lateral sealing mechanism according to claim 1, wherein the sealing element comprises a pair of sealing elements, wherein the cam includes a circular portion in a sealing area where the pair of sealing elements contact each other on the cam, and wherein the circular portion of the cam and the lateral direction drive mechanism determine a trajectory of the pair of sealing elements.

14. A lateral sealing mechanism according to claim 4, wherein the sealing element comprises a pair of sealing elements, and wherein the cam follower comprises:

a single cam follower that supports the pair of sealing elements, wherein the urging member is configured to urge the hinging member and press the single cam follower, supported on the hinging member, against the cam face.

15. A lateral sealing mechanism according to claim 4, wherein the hinging member tilts the sealing element.

16. A lateral sealing mechanism for use in a bag making and packaging machine for filling a packaged material while sealing a tubularly shaped packaging material in longitudinal and lateral directions to make a bag, the sealing mechanism being adapted to seal the packaging material in a lateral direction perpendicular to the transporting direction of the packaging material, the lateral sealing mechanism comprising:

a pair of sealing elements configured to contact the tubularly shaped packaging material from opposite sides thereof and to heat-seal the material in a lateral direction;

a pair of cams, each cam having a cam surface along a periphery thereof a pair of support mechanisms, each having a cam follower in contact with the cam face and each supporting one of the sealing elements, each of the support mechanisms being adapted to move circularly such that each of the sealing elements is brought into contact with and then separated from the packaging material;

a pair of rotary shafts for circularly moving each of he support mechanisms about a center of rotation thereof; and a lateral direction drive mechanism for moving the cams and the rotary shafts together in a direction perpendicular to the axes of the rotary shafts during the circular movement of the support mechanisms.

17. A lateral sealing mechanism as recited in claim 16, wherein each of the support mechanisms supports the sealing element tiltably with respect to the packaging material, and wherein when one of the sealing elements tilts in one direction, the other sealing element is operable to tilt in the opposite direction.

18. A lateral sealing mechanism according to claim 16, wherein the lateral direction drive mechanism, comprises:

a lateral direction drive mechanism for moving the cams and the rotary shafts together in a direction perpendicular to the rotary shafts during the circular movements of the support mechanisms to cause the sealing element to move in the lateral direction.

19. A bag making and packaging machine for filling a material to be packaged while sealing a tubularly shaped packaging material in longitudinal and lateral directions to make a bag, comprising:

shaping means for accepting a material to be packaged while shaping supplied sheet-like packaging material into a tubular shape;

a packaging material transport mechanism for transporting the tubular packaging material;

a longitudinal sealing mechanism for longitudinally sealing an overlapped portion of the transported tubular packaging material; and a lateral sealing mechanism for use in a bag making and packaging machine for filling a packaged material while sealing a tubularly shared packaging material in longitudinal and lateral directions to make a bag, the sealing mechanism being adapted for sealing the packaging material in a lateral direction perpendicular to a transporting direction of the packaging material, the lateral sealing mechanism comprising:

a sealing element operable to contact the tubular packaging material to seal the packaging material in a lateral direction;

a cam having a cam face on a periphery thereof;

a support mechanism having a cam follower engageable with the cam face and supporting the sealing element, the support mechanism being movable so that the sealing element is contacted with and separated from the packaging material;

a rotary shaft for rotating the support mechanism about a center of rotation thereof; and a lateral direction drive mechanism for moving the cam and the rotary shaft together in a direction perpendicular to the axis of the rotary shaft during the rotation of the support mechanism.

20. A lateral sealing mechanism according to claim 19, wherein the lateral direction drive mechanism, comprises:

a lateral direction drive mechanism for moving the cam and the rotary shaft together in a direction perpendicular to the rotary shaft during the rotation of the support mechanism to cause the sealing element to move in the lateral direction.

* * * * *